US009208185B2

(12) United States Patent
Vailaya et al.

(10) Patent No.: US 9,208,185 B2
(45) Date of Patent: Dec. 8, 2015

(54) INDEXING AND SEARCH QUERY PROCESSING

(71) Applicant: Nook Digital, LLC, New York, NY (US)

(72) Inventors: Aditya Vailaya, San Jose, CA (US); Jiang Wu, Union City, CA (US); Manish Rathi, Palo Alto, CA (US)

(73) Assignee: Nook Digital, LLC, New York, NY (US)

( * ) Notice: Subject to any disclaimer, the term of this patent is extended or adjusted under 35 U.S.C. 154(b) by 0 days.

(21) Appl. No.: 14/161,108

(22) Filed: Jan. 22, 2014

(65) Prior Publication Data
US 2014/0136533 A1 May 15, 2014

Related U.S. Application Data

(60) Division of application No. 13/607,535, filed on Sep. 7, 2012, now Pat. No. 8,676,820, which is a continuation of application No. 11/737,668, filed on Apr. 19, 2007, now Pat. No. 8,290,967.

(51) Int. Cl.
G06F 17/30 (2006.01)
G06F 7/00 (2006.01)

(52) U.S. Cl.
CPC .... *G06F 17/30321* (2013.01); *G06F 17/30424* (2013.01); *G06F 17/30675* (2013.01)

(58) Field of Classification Search
USPC .................................. 707/755, 758, 803, 769
See application file for complete search history.

(56) References Cited

U.S. PATENT DOCUMENTS

| 4,868,939 | A | * | 9/1989 | Tagtow .............................. 5/103 |
| 5,218,728 | A | * | 6/1993 | Lloyd et al. ....................... 5/118 |
| 5,875,441 | A | | 2/1999 | Nakatsuyama |
| 5,887,171 | A | | 3/1999 | Tada et al. |
| 5,960,383 | A | * | 9/1999 | Fleischer .......................... 704/9 |
| 5,999,939 | A | | 12/1999 | de Hilster et al. |
| 6,014,680 | A | | 1/2000 | Sato et al. |
| 6,078,924 | A | | 6/2000 | Ainsbury et al. |
| 6,161,107 | A | | 12/2000 | Stern |
| 6,338,056 | B1 | | 1/2002 | Dessloch et al. |
| 6,424,980 | B1 | | 7/2002 | Iizuka et al. |
| 6,604,099 | B1 | | 8/2003 | Chung et al. |
| 6,697,818 | B2 | | 2/2004 | Li et al. |
| 6,968,338 | B1 | | 11/2005 | Gawdiak et al. |

(Continued)

OTHER PUBLICATIONS

International Search Report and Written Opinion from PCT application No. PCT/US2008/04545, dated Aug. 19, 2008, 13 pages.

(Continued)

*Primary Examiner* — Kuen Lu
(74) *Attorney, Agent, or Firm* — Finch & Maloney PLLC

(57) ABSTRACT

A method for processing a search query according to one embodiment includes receiving a search query containing terms; combining at least some consecutive terms in the search query to create biwords; looking up at least some of the terms and biwords in a search index for identifying sections of documents containing the at least some of the terms and/or biwords; generating a content score for each of the identified sections based at least in part on a number of the terms and biwords found in the sections of each document, wherein the biwords are given a higher priority than matched terms, wherein the priority affects the content score; and selecting and outputting an indicator of at least one of the sections, or portion thereof, based at least in part on the content score.

20 Claims, 22 Drawing Sheets

(56) References Cited

U.S. PATENT DOCUMENTS

| | | | |
|---|---|---|---|
| 6,970,881 | B1 | 11/2005 | Mohan et al. |
| 7,139,752 | B2 | 11/2006 | Broder et al. |
| 7,143,091 | B2 | 11/2006 | Charnock et al. |
| 7,159,940 | B1* | 1/2007 | Atkins ............... 297/242 |
| 7,917,493 | B2 | 3/2011 | Vailaya et al. |
| 8,005,819 | B2 | 8/2011 | Vailaya et al. |
| 8,086,599 | B1* | 12/2011 | Heymans ............... 707/721 |
| 8,171,013 | B2 | 5/2012 | Vailaya et al. |
| 8,290,967 | B2 | 10/2012 | Vailaya et al. |
| 8,326,860 | B2 | 12/2012 | Vailaya et al. |
| 2001/0036322 | A1* | 11/2001 | Bloomfield et al. ......... 382/276 |
| 2001/0044959 | A1* | 11/2001 | Davis ............... 5/118 |
| 2002/0156817 | A1 | 10/2002 | Lemus |
| 2002/0184188 | A1 | 12/2002 | Mandyam et al. |
| 2003/0220915 | A1 | 11/2003 | Fagan et al. |
| 2004/0128615 | A1 | 7/2004 | Carmel et al. |
| 2004/0247206 | A1 | 12/2004 | Kaneda et al. |
| 2005/0024952 | A1* | 2/2005 | Leconte et al. ............ 365/199 |
| 2006/0015482 | A1 | 1/2006 | Beyer et al. |
| 2006/0047519 | A1* | 3/2006 | Lin ............... 704/278 |
| 2006/0089947 | A1 | 4/2006 | Gallivan et al. |
| 2006/0095345 | A1 | 5/2006 | Ka et al. |
| 2006/0124818 | A1* | 6/2006 | Wai ............... 248/349.1 |
| 2006/0288275 | A1 | 12/2006 | Chidlovskii et al. |
| 2007/0038586 | A1 | 2/2007 | Vaucois |
| 2007/0156665 | A1* | 7/2007 | Wnek ............... 707/4 |
| 2008/0263023 | A1 | 10/2008 | Vailaya et al. |
| 2012/0330944 | A1 | 12/2012 | Vailaya et al. |

OTHER PUBLICATIONS

International Preliminary Report on Patentability from PCT application No. PCT/US2008/004545, dated Oct. 20, 2009, 7 pages.

Jones, et al., "INDEX: The Statistical Basis for an Automatic Conceptual Phrase-Indexing System," John Wiley & Sons, Inc., Journal of the American Society for Information Science,1990, vol. 41, No. 2, pp. 87-97.

Prager, et al., "The Use of Predictive Annotation for Question Answering in TREC8," The Eighth Text Retrieval Conference, 1999, pp. 1-13.

Xiao-Ling, et al., "A New Method to Query Document Database by Content and Structure," Journal of Software, 2002, vol. 13, No. 4, pp. 1-8.

Lin, et al., "Detection and Analysis of Table Contents Based on Content Association," Springer-Verlag, 2005, pp. 132-143.

* cited by examiner

INDEXING AND SEARCH QUERY PROCESSING

RELATED APPLICATIONS

This application is a divisional of U.S. application Ser. No. 13/607,535, filed Sep. 7, 2012, which is a continuation of U.S. patent application Ser. No. 11/737,668, filed Apr. 19, 2007 (now U.S. Pat. No. 8,290,967), each of which is herein incorporated in its entirety by reference.

RELATED DOCUMENTS

The following documents have been filed under the U.S. Patent and Trademark Office Document Disclosure Program. Listed are the number, title, and date of receipt of the document by the U.S. Patent and Trademark Office.
U.S. Pat. No. 595,370: Process and Methods for Product Document Indexing and Search, Feb. 21, 2006
U.S. Pat. No. 606,574: Product Document Indexing and Search, Sep. 21, 2006
U.S. Pat. No. 606,576: Splitting Model Number, Sep. 21, 2006
U.S. Pat. No. 606,577: Query Recommender, Sep. 21, 2006
U.S. Pat. No. 606,579: Post Processing PDF Search Results, Sep. 21, 2006
U.S. Pat. No. 606,573: Product Search User Interface, Sep. 21, 2006

FIELD OF THE INVENTION

The present invention relates to document searching, and more particularly, this invention relates to methods for processing search queries, and index structures.

BACKGROUND OF THE INVENTION

Many product related documents, such as user's guides, installation guides, and operations manuals, are typically published in non-text formats, for example, the PDF format, and contain a large number of sections and many pages. Traditional techniques of indexing and searching a document are designed for small text-based documents such as web pages which discuss a single subject matter. Accordingly, present searching technology is ineffective at finding non-text based documents.

Further, large documents, such as product related documents, may cover many topics which serve different purposes and user needs at different times. The result is that users must first locate a document, and then open the document in a specific document reader, e.g. a PDF reader, and then manually search again within the document to find the right section and page for the answers.

Therefore, there is a current need for addressing these and other problems associated with document retrieval.

SUMMARY OF THE INVENTION

A method for analyzing and indexing a document includes receiving a document; converting the document to one or more text streams; analyzing, using a processor, the one or more text streams for identifying textual contents of the document, wherein the textual content contains words and bi-words; analyzing the one or more text streams for identifying sections of the document; indexing the identified word or bi-word in association with the sections in which word or bi-word is located, wherein the indexing further comprises assigning a predefined priority value to each word or bi-word within each section; and saving a result of the indexing in a data storage device.

A method for processing a search query according to one embodiment includes receiving a search query containing terms; combining at least some consecutive terms in the search query to create biwords; looking up at least some of the terms and biwords in a search index for identifying sections of documents containing the at least some of the terms and/or biwords; generating a content score for each of the identified sections based at least in part on a number of the terms and biwords found in the sections of each document, wherein the biwords are given a higher priority than matched terms, wherein the priority affects the content score; and selecting and outputting an indicator of at least one of the sections, or portion thereof, based at least in part on the content score.

An index structure for keyword searches, the index structure being embodied on a computer readable storage medium, includes a plurality of content words and biwords, the biwords comprising consecutive single word terms; for each of the content words and biwords, at least one document identifier containing information about a document containing the content word or biword; for each of the document identifiers, at least one position identifier containing information about a section in the document containing the content word or biword; and for each of the position identifiers, at least one priority bit containing a priority of the word or biword associated with the position identifier, wherein a higher weight is assigned to word or biword matching at the position identifier with the priority bits set than at another position identifier without the priority bits set.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

To aid the reader, much of the following description will be presented in terms of a Portable Document Format (PDF) document. It should be understood that this is done by way of example only, as the teachings herein are applicable to all types of unstructured and semistructured documents.

Figure 1:
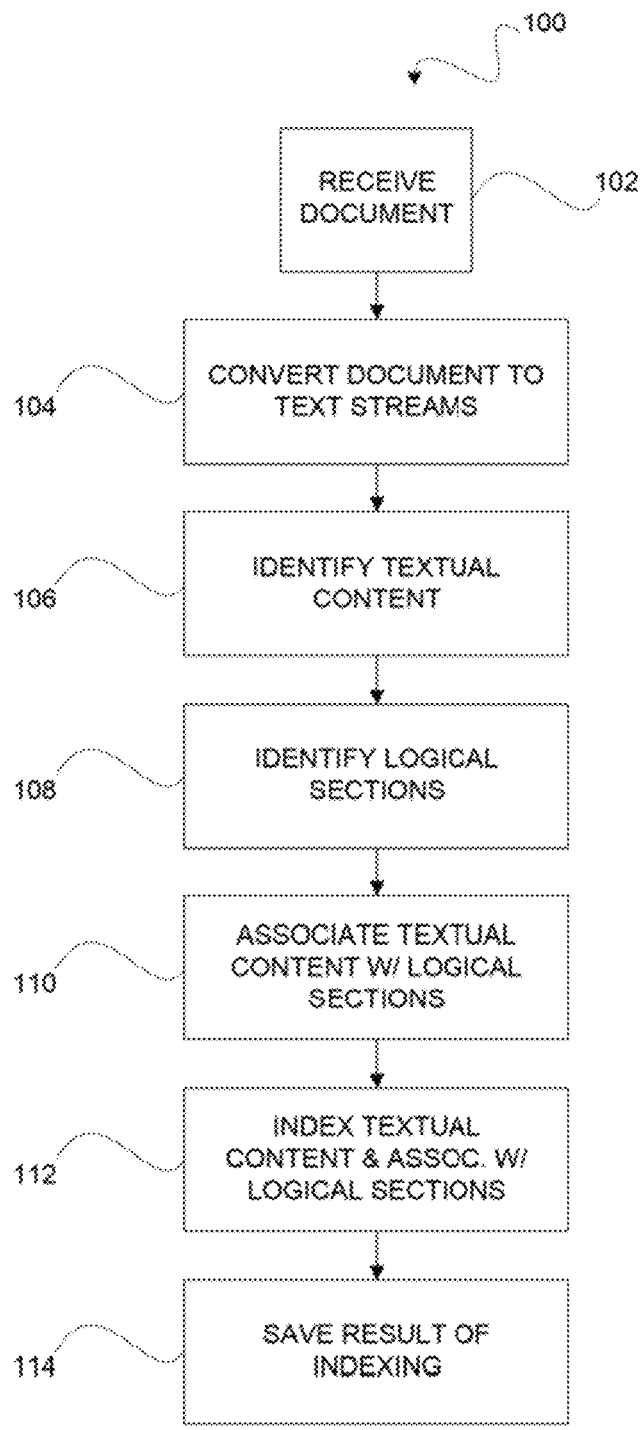
FIG. 1 illustrates a flow diagram of a method for analyzing and indexing an unstructured or semistructured document in accordance with one embodiment of the present invention.

FIG. 1 illustrates a flow diagram of a method 100 for analyzing and indexing an unstructured or semistructured document in accordance with one embodiment of the present invention.

As shown in FIG. 1, a document is received in step 102. The document may be unstructured or semistructured. For example, the unstructured or semistructured document may be in a printer format, such as Portable Document Format (PDF), or PostScript (PS) format, etc. The unstructured or semistructured document may also be a binary representation of dark and light areas of a scanned document. Further, the unstructured or semistructured document may not contain format markers. No information may be known about these documents, e.g. how lines of text fit together into paragraphs and sections, etc. Examples of unstructured or semistructured documents may include user manuals for electronic devices, product specification sheets, etc.

In step 104 the document is converted to one or more text streams. Additionally, in step 106 the one or more text streams are analyzed for identifying textual contents of the document. The textual contents may include words in the document. Also, in step 108 the one or more text streams are analyzed for identifying logical sections of the document. The sections may include groups of paragraphs of the document, each paragraph being individually detected by analyzing the one or more text streams. An extraction process may be performed in order to assist in this identification. Additionally, in step 110 the textual contents are associated with the logical sections. Further, in step 112 the textual contents and their association with the logical sections are indexed. Further still, the indexing may include assigning a weight to the textual contents. Also, in step 114 a result of the indexing is saved in a data storage device, for example a nonvolatile memory device, e.g., hard disk drive; volatile memory; etc.

In one embodiment, the content of the document is stored inside an index. Each word from the content may be further tagged with the section and paragraph from which the word comes from. In another embodiment, one or more text streams may be analyzed for identifying context information about each section, and the context information and the association of the textual contents and context information may be indexed with the logical sections.

Figure 2:
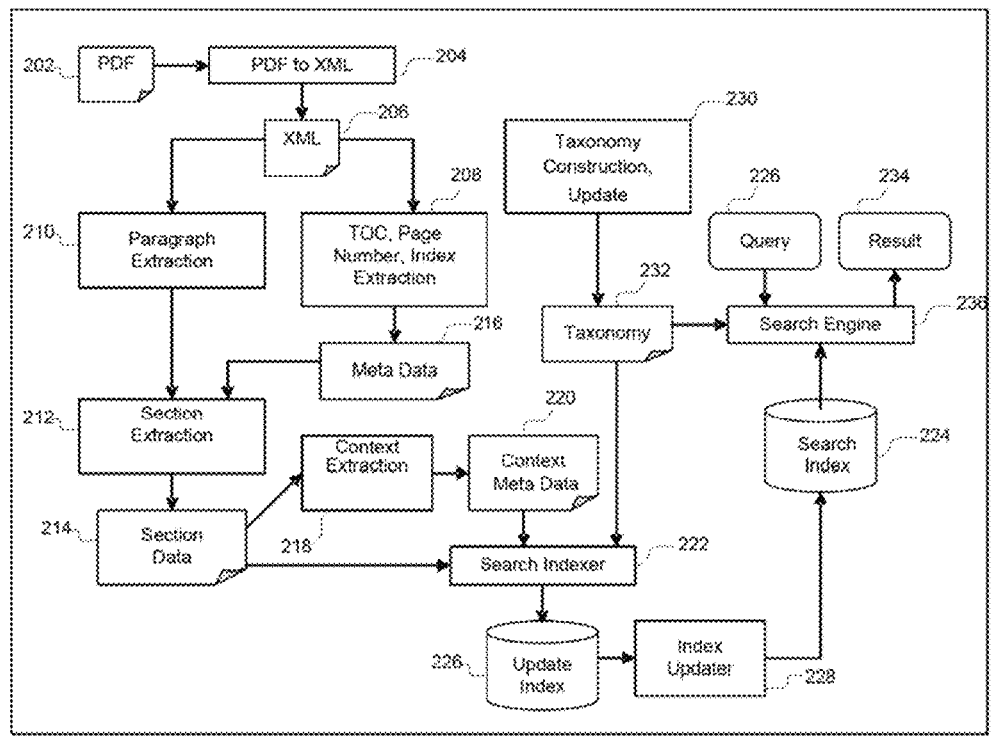
FIG. 2 illustrates a preferred embodiment for processing, indexing, and searching an unstructured or semistructured document in accordance with one embodiment of the present invention.

One preferred embodiment for processing, indexing, and searching an unstructured or semistructured document is shown in FIG. 2. As shown, a PDF document 202 in this example is converted to an Extensible Markup Language (XML) format document 206 in step 204. The conversion process extracts the text elements and the bookmark information from the PDF file. Bookmark information is used later to create or assist in the creation of Table of Contents (TOC) entries.

Data Model

Figure 3:
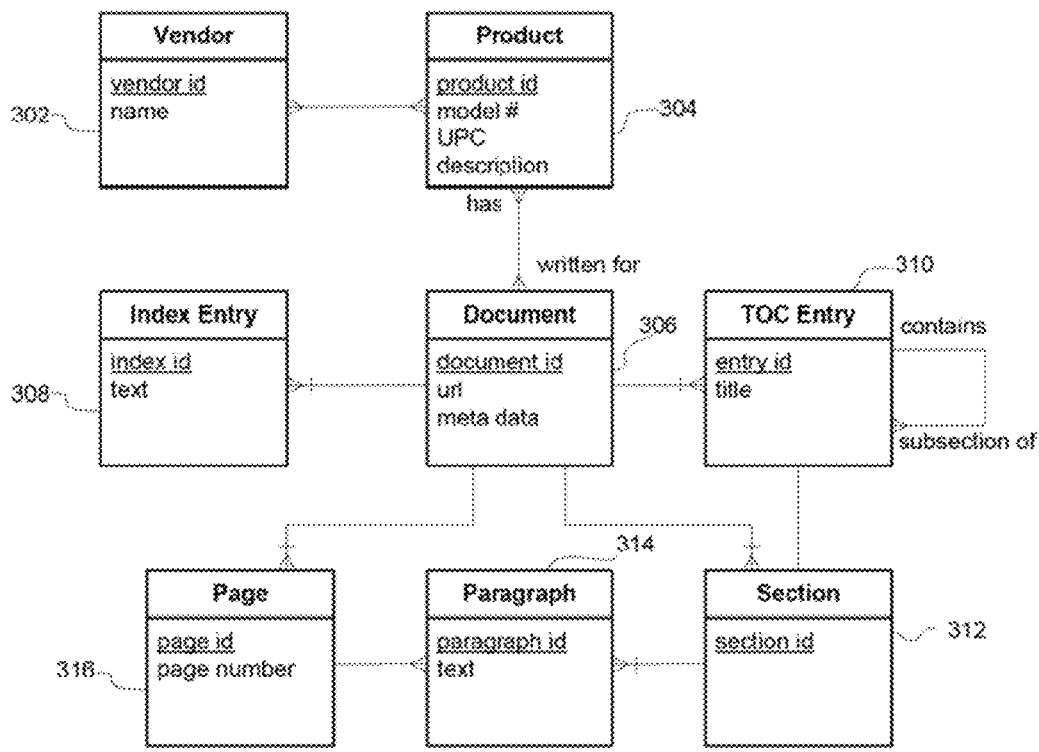
FIG. 3 illustrates a preferred embodiment of the data model used for processing product documents in accordance with one embodiment of the present invention.

A preferred embodiment of the data model used for processing product documents is shown in FIG. 3. As shown, the vendor module 302 comprises a vendor id and name of the products produced by the vendor. No two vendors will typically have the same vendor id. Additionally, the product module 304 comprises a product id, a model number, a Universal Product Code (UPC), and a description. No two products may have the same product id. The product module 304 may also contain information regarding one or more vendors that produced the product (may be more than one due to possible merger or acquisition) as well as information on the documents that are written for this product.

Further, the document module 306 comprises a document id, URL and other meta data about the document, and the products that this document is written for (a document can be written for multiple products, typically when the multiple products are variations of a single product model). No two documents may have the same document id. The document module 306 may also contain Table of Contents (TOC) entries, index entries, sections, and pages. Also, the index entry module 308 contains document information and an index id, where no two index entries may have the same index id and document information. The index entry module 308 also contains the text of the index entry, among other information.

The TOC entry module 310 contains document information and an entry id, where no two TOC entries may have the same entry id and document information. The entry module 310 further comprises the title of the TOC entry, subsections under this TOC entry, and a parent TOC entry that contains the current TOC entry. Further, the section module 312 contains document information and a section id, where no two section entries may have the same section id and document information. The section module 312 also contains a TOC entry for the section as well as paragraphs belonging to the section.

The paragraph module 314 contains section information and a paragraph id, where no two index entries may have the same paragraph id and section information. The paragraph module 314 further comprises the text of the paragraph and the starting page for the paragraph. Additionally, the page module 316 contains document information and a page id, where no two page entries may have the same page id and document information. The page module 316 also contains a local page number and the paragraphs that start on the page.

Figure 4:
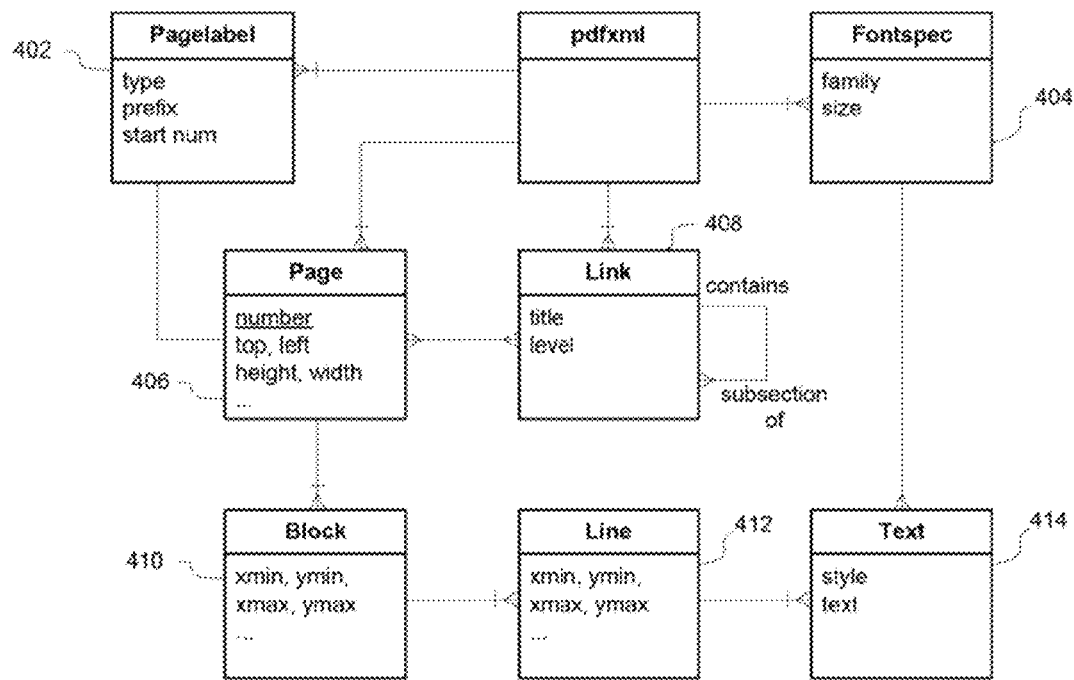
FIG. 4 illustrates a data model utilized in the conversion of a PDF to an XML document in accordance with one embodiment of the present invention.

An illustration of the data model utilized in the conversion of a PDF to an XML document is shown in FIG. 4. As shown, the data model contains data regarding one or more of pagelabel 402, fontspec 404, page 406, and link 408. The data model further contains data regarding one or more of block 410, line 412, and text 414.

Table 1 defines the aforementioned data model and illustrates one example of the output of the conversion to an XML file. Software tools such as xpdf (available from http://www-.foolabs.com/xpdf) use a similar output format for the XML file.

Continuing with the PDF example, a PDF format document only contains layout information, for example text geometry and font size. The document does not contain logical information such as section, paragraph, and sentences. For each text segment extracted, the segment's geometry and font information is saved. A text segment is a single sequence of characters of a particular font family, size and style. Then, the text segments that are close together are combined to form lines. Each line is made of multiple text segments along the line's writing axis. Finally, multiple lines that are closer together are placed inside a text block.

Page Number Extraction

Referring again to FIG. 2, in step 208 the page numbers may be extracted from the document, resulting in meta data 216. Document pages have a physical page index as well as a logical page number. Page numbers can be numeric such as 1, 2, 3, etc. or have prefixes such as 1-1, 1-2, 2-1, 2-2, or non-numeric such as i, ii, iii, a, b, aa, bb, etc. Files such as PDF files can embed page number information. When embedded, the PDF to XML conversion may issue pagelabel attributes.

When the document does not contain any embedded page labeling information, pattern extraction may be used to determine the page numbering. To do this, the lines on each page are sorted by the primary rotation. The primary rotation indicates whether the text on the page is mostly facing up, facing right, facing down, or facing left. From this point on, the word "top" and "bottom" are used with respect to the primary rotation. For example, if the primary rotation is facing right, then "top" means "right-most" and "bottom" means "left-most".

Additionally, any repeating lines across pages are detected and deleted. Repeating lines occur when the author places text such as chapter title and copyright notices on multiple pages. To detect repeated lines, a line from page N is chosen

TABLE 1

| Tag | Description |
| --- | --- |
| <PDFxml> | This is the outer most tag, everything else is enclosed in here. |
|   <bookmark> | Start of the bookmark section. |
|     <link> | One or more links. Each link describe a single entry in |
|       <link>...</link> | the bookmark, attributes are: title, level, page, etc. A |
|     </link> | link may contain other link tags for subsections. |
|     ... | |
|   </bookmark> | End of the bookmark section. |
|   <pagelabels> | Start of the page label section. |
|     <pagelabel ... /> | One or more page labels. Each tag describes a single |
|     ... | range of pages using a particular page label style. Attributes are: pageidx, type, prefix, and start |
|   </pagelabels> | End of the page label section. |
|   <page ...> | Start of a page. Attributes are number, top, bottom, width, and height. |
|     <fontspec ... /> | Zero or more fontspec tags. Each fontspec describes a |
|     ... | font that is first used on this page. Attributes are id, family, and size. |
|     <block ...> | Start of a block tag. Attributes are xmin, ymin, xmax, ymax, numlines |
|       <line ...> | Start of a line tag. Attributes are xmin, ymin, xmax, ymax, base, charpos, and charlen |
|         <text ...>...</text> | One or more text tags. Each text tag contains the font |
|         ... | attribute, which points to a font id in a previously seen fontspec tag. Body of the tag contains the text. The body may also contain <b>...</b> or <i>...</i> style modifier for bold, italic, or bold and italic text. |
|       </line> | End of the line tag, other line tags may follow. |
|     ... | |
|     </block> | End of the block tag. Other block tags may follow. |
|   ... | |
|   </page> | End of the page tag. Other page tags may follow. |
| ... | |
| </PDFxml> | End of the outer tag | and it is determined if another line with the same text appears at the same location in page N+1, N−1, N+2, or N−2. The reason for using N+2 and N−2 is that sometimes text may repeat on the odd or the even pages only.

After the repeating lines are eliminated, all the lines appearing at the "bottom-most" edge of the page are selected. Then each line is placed inside one of multiple locations along the bottom edge. The example, illustrated in Table 2, uses 6 locations, though more or less may be implemented.

TABLE 2

| 2 | | | | | Getting Started |
|---|---|---|---|---|---|
| 1/6 | 2/6 | 3/6 | 4/6 | 5/6 | 6/6 |

In the above table, the text "2" appears at the 1/6 location. The text "Getting Started" appears at the 6/6 location. For page N and each location of N, a delta is computed using the text extracted at that location and subtract the text found on the largest page prior to N that also has a piece of text at the same location. For the purpose of this delta computation, only numeric page numbers are used in one embodiment. Numeric page numbers may be any text in one of the following formats, as shown in Table 3.

TABLE 3

| <prefix> - <number> | E.g. 1-1, A-1 |
|---|---|
| <text> <number> | E.g. 1, 20, 2 Getting Started, Getting Started 2 |

For example, if page's 1/6 location contains the text {<empty> 2 <empty> 4 <empty> 6 <empty> . . . }, then the corresponding offsets for the 1/6 location is {<empty> <empty> <empty> 2 <empty> 2 <empty> . . . }

Using the offsets from the various locations across all pages, the page numbers for the documents can be determined using the following tests:

2 page inner: there are two logical pages per physical page. The page number occurs at the 3/6 and 4/6 location respectively for each of the logical pages. This scenario is detected by seeing if the offset is 2 for the 3/6 or the 4/6 location for most of the pages in the document.
  2 page outer: there are two logical pages per physical page. The page number occurs at the 1/6 and 6/6 location respectively for each of the logical pages. This scenario is detected by seeing if the offset is 2 for the 1/6 or the 6/6 location for most of the pages in the document.
  2 page middle: there are two logical pages per physical page. The page number occurs at the 2/6 and 5/6 location respectively for each of the logical pages. This scenario is detected by seeing if the offset is 2 for the 2/6 or the 5/6 location for most of the pages in the document.
  1 page middle: there is one logical page per physical page. The page number occurs at 3/6 or 4/6 location. This scenario is detected by seeing if the offsets are 1 for the 3/6 or the 4/6 location for most of the pages in the document.
  1 page outer: there is one logical page per physical page. The page number occurs at the 5/6 or the 6/6 location. This scenario is detected by seeing if the offsets are 1 for the 5/6 or the 6/6 location for most of the pages in the document.
  1 page outer mirror: there is one logical page per physical page. The page number occurs at the 1/6 or the 2/6 location, and alternates to the 5/6 and the 6/6 location on the next page. This scenario is detected by seeing if the offsets are 1 for the 1/6, 2/6, 5/6 or the 6/6 location for most of the pages in the document.

When the style of the page layout is determined to be one of the 6 scenarios, the page number is extracted from the corresponding text located at the right location from each page to produce a list of logical page numbers. If the offset test fails for all 6 scenarios, then the "top-most" line is used to see if the page numbering occurs at the top of the page. For detection at the top of the page, a similar set of steps is followed: duplicate elimination, place text into multiple separate locations, compute offsets, and look for offset patterns.

If page numbers cannot be detected from either the top or the bottom of the page, an error is flagged for human intervention to see if the document is an exception to the above rules. Alternative schemes of detecting page numbers may also be used.

Paragraph Extraction

Referring again to FIG. 2, in step 210 paragraphs may be extracted from the document. PDF documents do not contain information about logical paragraphs. During PDF to XML conversion, the geometry information about lines may be output. Lines are then placed inside blocks based on the line proximity to each other with respect to their font size. These blocks may be analyzed for joining lines into paragraphs. To reconstruct the logical paragraph, the primary rotation of a page is determined. The primary rotation is the direction on which most of the text is written. From this point on, all directions are with respect to the primary rotation. For example, if most of the text is facing right, then the primary rotation is up. The direction "up" points to the physical right; "left" points to physical up, "right" points to physical down, and "down" points to the physical left. Additionally, each page is split into multiple logical pages, and each logical page is divided into columns. For each column, the blocks are ordered yx, meaning order by ascending primary rotation dimension, followed by left-to-right for the perpendicular dimension. Further, iterations are performed through all blocks, for block N:

If N has one line inside, and block N+1 has one line, and both lines are using the same base line, lines are added from both blocks into the current paragraph.
  Else make consecutive lines in the block with the same font family, size, and style into the same paragraphs. The line style is bold or italic if all text within are bold or italic. The font size of a line is the font size of the first text segment inside the line.

TOC Extraction

Referring to FIG. 2, again in step 208 the Table of Contents (TOC) may be extracted from the document, resulting in meta data 216. The TOC is extracted in various ways: by reading the bookmarks from a PDF file, by analyzing the text in the PDF file, or both. Some PDF documents have embedded bookmark information. Each bookmark is a link with a title and a physical page index pointing to a physical coordinate on a page. This information, when present, is outputted to the XML file during the PDF to XML conversion.

For PDF documents that don't have embedded bookmarks, pattern extraction is used to form the TOC. TOC extraction is performed after a page is divided into logical pages and each of the logical pages is divided into columns. TOC extraction then operates on each of the columns. To create the TOC, starting on the first page a search is performed for a block with the text "Contents" or "Table of Contents" within the columns of the page. Once found, it represents the start of the TOC. Then a search continues from that point to look for lines with the text "Index", or have a font size greater than or equal to the TOC heading size. The lines between the starting and the ending points are then processed for TOC entries.

To process a TOC entry, each line is analyzed to determine if it ends with a number. If it does, then the text before the number represents the entry title with the number representing the logical page number. If a line does not end with a number, then the next line is analyzed to see if it has the same font and size. If it does, then the entry is made of two lines with the second line being a continuation of the first line. The text is joined between the two lines and checking continues to see if there is a page number for this entry. Otherwise, the line is not used as a TOC entry because it has no page number associated with it.

For each TOC entry found, its font family and size is pushed onto a stack. TOC entries of the same font family and size are considered to be at the same level. Each TOC entry can be a member of another TOC entry. This is accomplished by adding the current TOC entry to the last TOC entry that has a different font family and size in the next location on the stack. When no parent entry is found, then this TOC entry is at the root level. At the end of this process, the TOC entries form a hierarchical tree.

Note that a TOC tree produced through text pattern analysis contains logical page numbers while a TOC tree produced through embedded bookmarks contains physical page index. Hence, a TOC tree produced through text pattern analysis may require page number detection as well so that these logical page numbers can be mapped to physical page indexes.

Section Extraction

Referring again to FIG. 2, in step 212 section extraction is performed on the document, resulting in section data 214. Section extraction is performed using the extracted TOC of the document to detect section boundaries. If the TOC is extracted via text analysis, then the page number for each TOC entry is first mapped to a physical page index using the extracted page numbers.

Section extraction starts at the first paragraph after the end of the TOC. The first paragraph after the TOC is used to compare against each TOC entry to find the first matching entry. This anchors the first section after the TOC section to a particular TOC entry in the TOC hierarchy.

From that point on, each paragraph on the subsequent pages are scanned against the next several, e.g. 2, 3, 4 ... TOC entries. Assume the system uses 3 TOC entries. During this scanning, a particular page may be jumped to using the page index associated with the TOC entries. If any one of the 3 TOC entries is found to match a paragraph exactly, it is then determined if a fuzzy match needs to be performed. A fuzzy match is required when no exact match is found for the first or the first two TOC entries. In the case of fuzzy match, the first TOC entry is fuzzy compared against each paragraph between the previous exact TOC match and the current exact TOC match. If needed, the fuzzy match is continued using the $2^{nd}$ TOC entry against the paragraphs between the first fuzzy matched paragraph and the current exact TOC matched paragraph.

The fuzzy compare used may be based any string similarity algorithms, e.g. Hamming, Levenshtein, etc.

After a section's boundary is determined, the information about the section is saved into two files: a section file and a paragraph file.

The section file is a binary file containing one record for each section. The section file is named <PDF filename>.section. Records are packed next to each other without any gaps. Integers stored in the record are 32 bit in Big Endian byte order. Strings stored in the record are in UTF-8 format. Inside each record, the following information is stored, as shown in Table 4.

TABLE 4

| 32 bit int | 32 bit int | 32 bit int | 16 bit | UTF-8 String |
|---|---|---|---|---|
| section index | section offset | parent index | UTF length | title |

As shown in Table 4, the section index starts with 0 and is incremented by 1 for each section extracted. The section offset represents an offset into the paragraph file, in 256 bytes. The parent index represents the parent section index. The UTF length represents the byte length of the title field And the title represents the title of the section.

A corresponding file called <PDF filename.section.txt is also generated that contains the text version of the file. This file is used for debugging.

The paragraph file is a binary file containing records for each paragraph. The paragraph file is named <PDF filename>.para. A record in the paragraph file may start on the next available 256 boundary. Integers stored in the record are 32 bit in Big Endian byte order. Strings stored in the record are in UTF-8 format. As a result, there may be gaps between two records. For each paragraph record, the following information is recorded, as shown in Table 5.

TABLE 5

| 32 bit int | 32 bit int | 16 bit int | UTF-8 String | Padding |
|---|---|---|---|---|
| section index paragraph offset | page index | UTF length | paragraph text | padding |

As shown in Table 5, the section index represents the section this paragraph belongs to, and the paragraph offset represents the byte offset in 256 bytes, relative to the starting of the section. This field and the section index are stored together inside the first 32 bit int. Additionally, the page index represents the page index on which this paragraph starts, and the UTF length represents the byte length of the paragraph text. Further, the paragraph text represents the text of the paragraph in UTF-8 format, and the padding represents the bytes used to pad the record to the next 256 byte boundary.

The section index and the paragraph offset are encoded into a single 32 bit integer. See the section on Index creation on the format of this integer.

Table 6 illustrates an example of how the padding is computed.

TABLE 6

| Section. Paragraph (4 bytes) | Page Num (4 bytes) | Para UTF len (+2 bytes) | Para UTF string | Padding | Absolute Para offset in bytes | Section Offset |
|---|---|---|---|---|---|---|
| 0:0 | 1 | 10 | 10 bytes | (256 − 4 − 4 − 2 − 10) = 236 bytes | 0 | 0 |
| 0:1 | 1 | 300 | 300 bytes | 202 bytes | 256 | |

TABLE 6-continued

| Section. Paragraph (4 bytes) | Page Num (4 bytes) | Para UTF len (+2 bytes) | Para UTF string | Padding | Absolute Para offset in bytes | Section Offset |
|---|---|---|---|---|---|---|
| 0:3 | 1 | 246 | 246 bytes | 0 bytes | 512 | |
| 1:0 | 2 | 5 | 5 bytes | 241 bytes | 768 | 4 |
| 1:1 | 2 | 1000 | 1000 bytes | 14 bytes | 1792 | |
| 2:0 | 2 | 10 | 10 bytes | 236 bytes | 2048 | 9 |

The section offset is stored as part of the section binary file, as this storage format helps to optimize skipping to a specific paragraph of a specific section. For example, to read Para 2 of Section 1 in the file above, one can compute the byte offset by performing the following computation, as shown in Table 7:

TABLE 7

Figure 5:
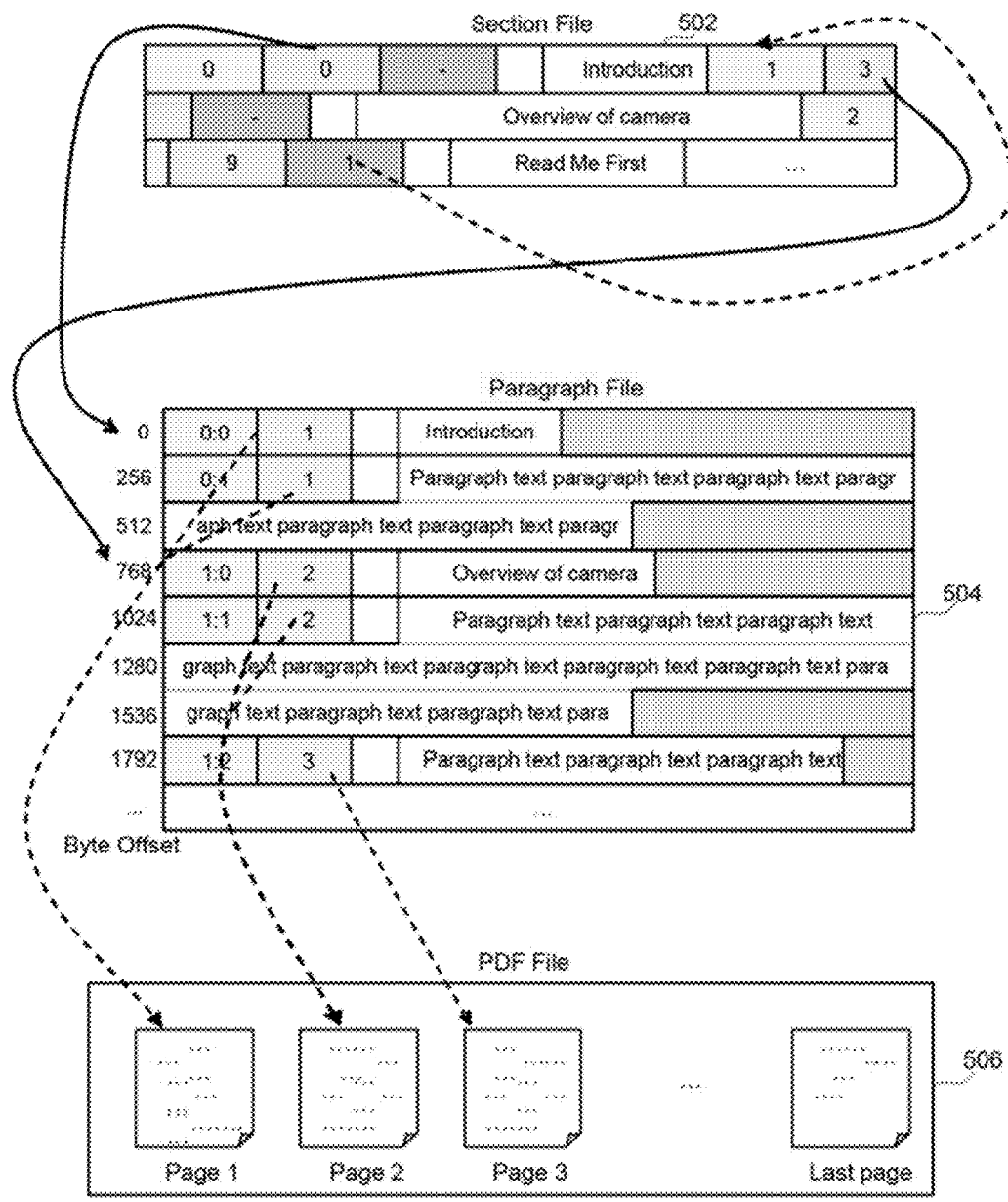
FIG. 5 illustrates an internal record organization in accordance with one embodiment of the present invention.

(Section offset * 256) + (ParaNum − 1) * 256 bytes = (4*256 + (2 − 1)*256) bytes Additionally, FIG. 5 depicts the internal record organization and the relationship between the records from the section file 502 and the paragraph file 504, as well as the PDF file 506.

Document Index Extraction

Referring again to FIG. 2, in step 208 the document index may be extracted from the document, resulting in meta data 216. Many documents have an Index section toward the end. The index contains useful terms for the document and where in the document the term appears. This index information may be extracted and the word boosted from the index entry on the page the index entry points to. Because the index entry points to logical page numbers, the page numbers may be used to map the logical number to the corresponding physical page index.

Taxonomy Extraction

Referring again to FIG. 2, in step 230 taxonomy-related information may be extracted from the document, resulting in taxonomy information 232. Taxonomy-related information may include identification information such as product vendor, product identifier (product model number, product name), etc., and may be associated with the textual contents of the document. The context of the document may also be correlated to taxonomy-related information. Additionally, the taxonomy information may be indexed.

Character Offset Index for Keyword Highlighting

Further, a char offset index may be extracted from the document for keyword highlighting. During the display of PDF pages for a search result, it may be desirable to highlight keywords that are entered as a part of the query syntax. It may therefore be desirable to extract the PDF char offset information for the matching keyword in order to perform the keyword highlighting. The PDF char offset is then sent to the PDF render, which paints a rectangle with background color before painting the character producing the highlighting effect.

Inside a PDF file, the text reading order is not necessary the same as the internal PDF char offset, as demonstrated in Table 8.

TABLE 8

| a brown fox jumps | over | a lazy dog | may be made of 3 text chunks:
    chunk 1: PDF char offset = 35, len = 17
    chunk 2: PDF char offset = 19, len = 4
    chunk 3: PDF char offset = 52, len = 10

Note that chunk 2 is not in sequential order after chunk 1 inside the PDF file. If the search query keyword is "lazy", then its corresponding PDF char offset 55 may need to be determined in order to instruct the PDF render to highlight the word "lazy" in the above sentence. Also note that the <space> characters between "jumps over" and "over a" are not present in the PDF file. These <space> characters are artificially introduced in the logical paragraph.

To quickly create the highlighting information for a PDF page, a char offset index is constructed to map between the logical char offset to PDF character offset. The PDF to xml generator may first produce the PDF char offset for every text chunk from the PDF file. Then during the construction of the logical paragraphs, a char offset index may be generated.

There is one char offset index for each section of the PDF file. The char index file is an ordered list of tuples representing key value pairs, as shown in Table 9.

TABLE 9

| Paragraph offset | Logical char offset | PDF page number | PDF char offset | Chunk Length |
|---|---|---|---|---|

The (paragraph offset, logical char offset) is the key. The logical char offset is the character position relative to the first character of the chunk within the paragraph. The first character of a paragraph has the logical char offset of 0. See previous sections on how the paragraph offset is computed.

Using the above example, if the sentence belongs to paragraph offset 3 and appears on the page 13 of the PDF document, then the corresponding part of the char offset index file may contain the following, shown in Table 10.

TABLE 10

. . .
(3, 0, 13, 35, 17)
(3, 18, 13, 19, 4)
(3, 23, 13, 52, 10)
. . .

The list of key value pairs is ordered in ascending order by the key value (paragraph offset, logical char offset).

During keyword highlighting, the starting character of a word inside the logical paragraph is first located using the paragraph file for a section. This produces a list of (highlight paragraph offset, first char offset, word length). Then each value is translated from the list using the char offset index file by doing the following for every (highlight paragraph offset, first char offset, word length), preferably but not necessarily in the following order:

Locate the largest (paragraph offset, logical char offset) in the char index file that is smaller than or equal to our given (highlight paragraph offset, first char offset). This can be done using a binary search or just a linear scan. A linear scan can work well because all the (highlight paragraph offset, first char offset, word length) needing translation can be ordered first, then the index file can be gone through linearly without going backward in the char offset file just like during a merge.

Compute the PDF offset as (PDF char offset+first char offset−logical char offset).

Compute the PDF length as MIN (PDF chunk length−PDF offset, word length).

If word length is greater than the PDF length computed in step 3, then produce a PDF offset and length for the first set of characters up to the PDF length in the word. The remaining characters of the word are recursively check from step 1 as though it is a new word.

Figure 6:
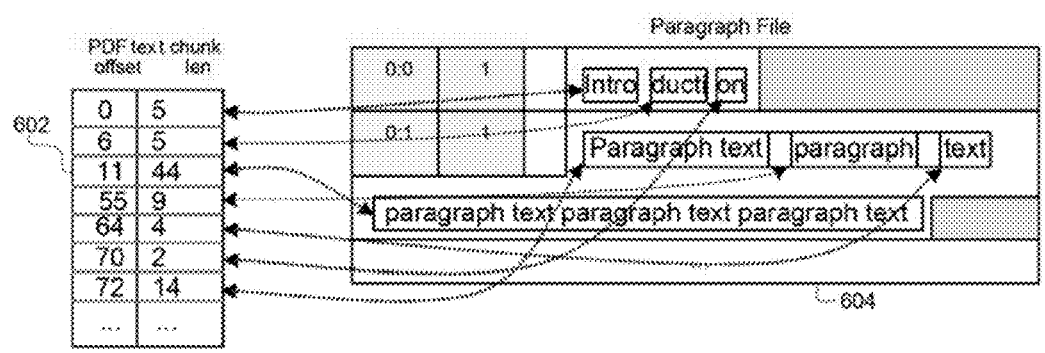
FIG. 6 demonstrates the relationship between a PDF char stream and a logical char stream in accordance with one embodiment of the present invention.

In yet another embodiment, FIG. 6 demonstrates the relationship between a PDF char stream 602 and a logical char stream 604.

Content Extraction

Referring again to FIG. 2, in step 218 the context of a document may be extracted from the document, resulting in context meta data 220, which may be indexed. The context for a document may include the list of products this document is written for. This context can be provided manually by the person who first obtained this document or extracted from the site map where the document was downloaded from. Alternatively, words inside the title page of the document or the URL link of the document can be taken and looked up against a well-defined dictionary of vendor name and product model numbers. For each product identified, the following information is saved as shown in Table 11.

TABLE 11

| | |
|---|---|
| vendor | list of vendor (or vendors if multiple) who created this product, e.g. Sony, Nikon |
| model # | model number of this product, e.g. dc4800, e995 |
| UPC | (later) UPC serial codes for the product. E.g. 01234567900 |
| description | a textual description of the product, e.g. "27" flat panel computer display", "digital camera with zoom" |

The UPC and description may be obtained from a separate product information catalog after the product is identified by vendor and model number. The context information obtained is then stored in as a set of metadata associated with this document.

Search Index Creation

Referring again to FIG. 2, in step 222, after processing a document into sections and extracting its context information, a searchable index 224 is created and updated on both the content and the context utilizing an update index function 226 and index updater function 228. The indexer may be adapted from Open Source Lucene. The content index is stored inside a Lucene field called "content" while the context information is stored in various other fields.

Content

For each content word indexed, the document, the section and the paragraph from which this word comes from is stored. This is done by manipulating the word position value inside the Lucene index. Inside a Lucene inverted word index, each word is associated with the following logical pieces of information, as shown in Table 12.

TABLE 12

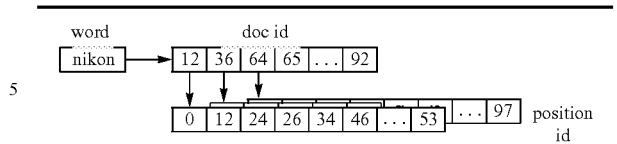

The doc id points to the documents that contain the given word. Then for each document, the position id for a document is used traditionally to point to the offsets within the document on where this word occurs.

During the index creation, each word's position information may be manipulated such that it is used to encode the section and the paragraph location of the given word. The position id is a 32 bit integer. The 32 bits are divided into 3 bit sets, as shown in Table 13.

TABLE 13

| 1 | 13 bits | 16 bits | 2 |
|---|---|---|---|

The most significant bit, the sign bit, is not used. The next 13 bits are used to store the section id within which a word comes from. Using this scheme, a document can have up to $2^{13}=8192$ distinct sections. The next 16 bits are used to store the paragraph chunk offset into the paragraph file. Remember that a paragraph file stores each paragraph on a 256 byte chunk alignment. As a result, a value of 23 in the paragraph chunk offset points to the byte offset 23*256=5888 in the paragraph file. Using this scheme, each section can have a maximum of 65536 paragraphs. The size of each paragraph is unlimited. However, the minimum amount of space taken up by a paragraph is 256 bytes inside the paragraph file. The paragraph file layout is shown in Table 14.

TABLE 14

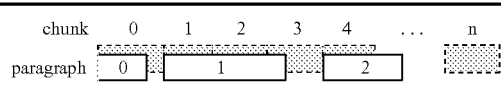

The least significant 2 bits are used to store a priority value associated for the given word. The value 0 is the default. Other values are used to encode the importance of the word. For example, bi-words can be configured to have a priority value of 1. During scoring, a different weight is associated to bi-words by checking if a matched word has a priority value of 1.

Context

The document context is one or more products this PDF file is written for, the type of the document, and other meta information. Each product can be described by one or more identifiers, such as UPC, vendor name, and model number, and a product description. A context index is created by encoding these context meta data into a special section 0 of the document.

Storing meta information into section 0 of the index allows for the simplification of the index lookup process. The lookup index can be gone through using a single loop without the need to merge lookup data across several indices. The same query keywords may also be used for both the content and the context index to easily figure out the aggregate number of keywords matched.

Since there are several pieces of meta data for the document context, different paragraph locations within section 0 are used to store the different pieces of meta data. Table 15 outlines some of the meta data stored.

TABLE 15

| Paragraph # | Meta Data Stored |
|---|---|
| 0 | Vendor, vendor alias terms |
| 1 | Product family, family alias terms |
| 2 | Full model names |
| 3 | Partial model terms |
| 4 | Alpha model terms |
| 5 | Document type terms |
| 6 | Document title terms |
| 7 | UPC or vendor part number codes |
| 8, 9 | Unused for now |
| 10-32 | Special value "_len" used to denote the string length of the full model name |
| >32 | Unused for now |

This method of storing meta data is very flexible. When additional meta data are needed in the future, they can be added to section 0 using paragraph numbers that are unused.

During the indexing process, some or all of the following special handling operations may also be performed:

For the Content Index:

Remove any words that match the document's vendors and model number. For example, when indexing a sony e550 document, the words "sony" and "e550" are not indexed as a part of the content.

Stem each word that is in the plural or past tense form to its corresponding singular and present form. For example, cats becomes cat, films becomes film.

Detect if a word is a stop word. For example, a, the, it, its, my . . . are considered stop words. Note that stop words are not eliminated from the index, they are only detected for the purpose of performing the next step to create bi-words.

Create additional bi-words on any two adjacent non-stop words from the same paragraph that are separated by a single non-alphanumeric character such as a space, a dot, a hyphen, or any other punctuation. A bi-word is created by combining the two normal words and add a "." separator in between. When a bi-word is created, it is assigned to the same section and paragraph id as the individual words. However, the priority bit for the bi-word is set to 1 instead of 0. For example, when "how to operate your digital camera" in a paragraph is seen, the bi-word created is "digital.camera". As a result, the index now contains the following tokens: how, to, operate, your, digital, camera, digital.camera.

Eliminate redundant words within a single paragraph. For example, if the paragraph contains " . . . for best quality pictures, set the picture mode . . . ", the corresponding index may contain the following tokens "for best quality picture set the mode"

For the Context Index:

Context terms are constructed specially, especially for the full and the partial model terms.

Figure 7:
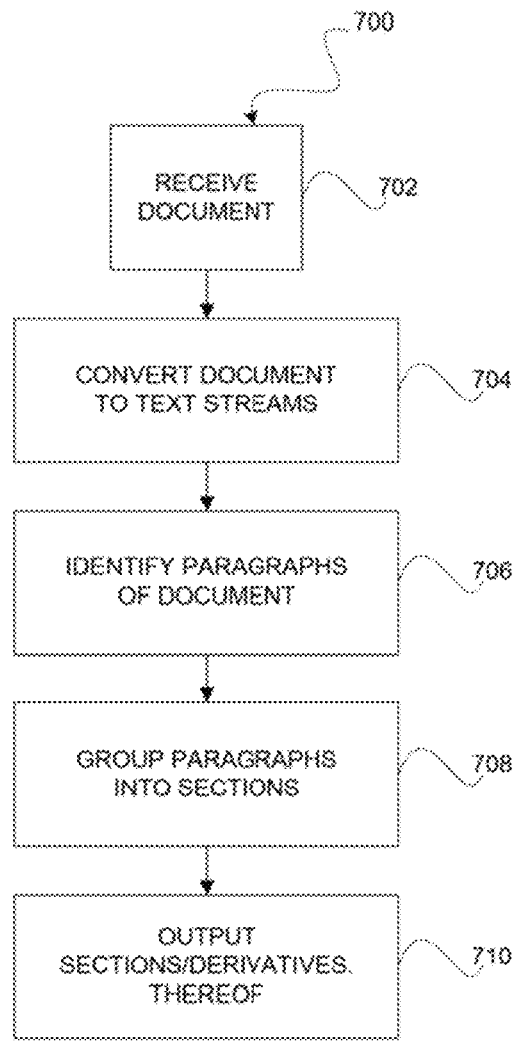
FIG. 7 illustrates a flow diagram of a method for analyzing and indexing an unstructured or semistructured document in accordance with another embodiment of the present invention.

FIG. 7 is a flow diagram of a method 700 for analyzing and indexing an unstructured or semistructured document in accordance with another embodiment of the present invention. As an option, the process 700 may be implemented in the context of the architecture and environment of FIGS. 1-6. Of course, however, the process 700 may be carried out in any desired environment.

As shown in FIG. 7, an unstructured or semistructured document is received in step 702. Additionally, in step 704 the document is converted to one or more text streams. Further, in step 706 the one or more text streams is analyzed for identifying paragraphs of the document, and in step 708 the paragraphs are grouped into sections. Further still, in step 710 the sections, or a derivative thereof, are output to at least one of a user, another system, and another process.

Additionally, page numbers may be extracted from the document, and the sections may be associated with the page numbers. Also, the boundaries of the sections may be determined at least in part based on an analysis of a table of contents of the document.

Figure 8:
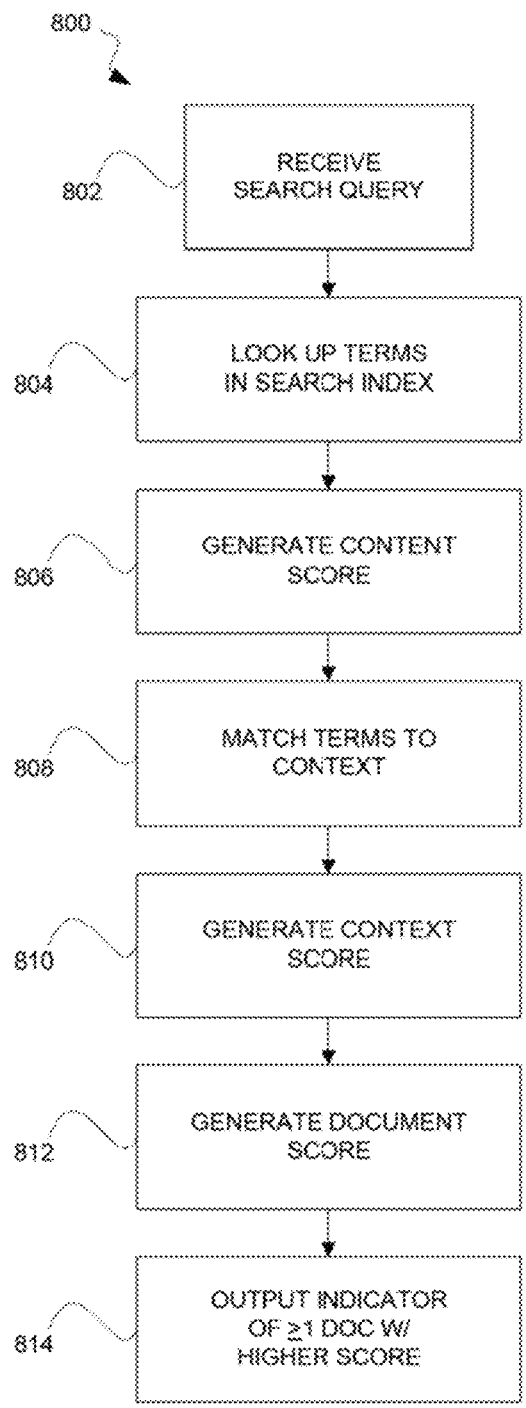
FIG. 8 illustrates a flow diagram of a method for processing a search query in accordance with one embodiment of the present invention.

FIG. 8 is a flow diagram of a method 800 for processing a search query in accordance with one embodiment of the present invention. As an option, the process 800 may be implemented in the context of the architecture and environment of FIGS. 1-7. Of course, however, the process 800 may be carried out in any desired environment.

As shown in FIG. 8, a search query containing terms is received in step 802. Additionally, in step 804 at least some of the terms are looked up in a search index for identifying sections of documents containing the at least some of the terms. This may include identifying paragraphs in the sections containing the at least some of the terms and calculating a paragraph score for each of the paragraphs based at least in part on a number of the terms appearing in each of the paragraphs, wherein a section score is calculated based on the paragraph scores of the paragraphs in the section.

Further, in step 806 a content score is generated for each of the documents based at least in part on a number of keywords found in the sections of each document. The content score may reflect all matches in the document, or the highest section score or scores in one or more of the sections. Weighting may be applied to each keyword found in the sections of the documents, where the weighting affects the content score. In addition, in step 808 at least some of the terms in the search index are looked up for attempting to match one or more of the terms to context information in the search index, the context information being associated with at least one of the documents. Weighting may be applied to each keyword matching the context information, where the weighting affects the context score.

In step 810, a context score is generated based at least in part on the matching of terms to the context information. This may include the case where the context score is zero if none of the terms match context information. Further, in step 812 a document score is generated for each of the documents based at least in part on the content score and the context score. The document score may be calculated based at least in part on the sections scores of the sections of the documents. Also, in step 814 an indicator of at least one of the documents, or portion thereof, is output for the at least one of the documents having a higher document score relative to other of the documents. Additionally, an indicator of at least one of the sections having a higher paragraph score relative to other of the sections may be output. The indicator may be of a section of the at least one of the documents.

Query Parsing

Referring again to FIG. 2, in step 226 the system can submit user search queries to locate the right document and the sections within the document. After the GUI accepts the user entered search terms, the application server would construct a query based on the given terms.

The user entered keywords go through the following process to arrive at a query:
- lower case all terms
- remove punctuation and redundant spaces
- remove stop words
- convert words in plural and past tense into their non-plural and present form
- append additional biwords by joining together consecutive words
- append a special term "_len"

For example, a user given query:
A brown fox jumps over the lazy dog.
is processed through the following steps:
1. lower case all terms: a brown fox jumps over the lazy dog.
2. remove punctuation and redundant spaces: a brown fox jumps over the lazy dog
3. remove stop words: brown fox jumps over lazy dog
4. remove plural and past tense: brown fox jump over lazy dog
5. adding bi-words: brown fox jump over lazy dog brown.fox fox.jump jump.over over.lazy lazy.dog
6. add special term "_len": brown fox jump over lazy dog brown.fox fox.jump jump.over over.lazy lazy.dog _len The constructed query is then submitted to the search engine for lookup.

Query Recommender

In another embodiment, a query recommender may be utilized. When user makes mistakes in entering the query, they may not get the expected results. The mistake may be a result of misspelled words or imprecise model numbers. A query recommender tries to find good alternatives in these circumstances. For example, the query recommender may be used to correct product model numbers.

In one embodiment, the query recommender may correct a single unmatched term. When a single query term does not match any document, Query Recommender shall find alternatives to that term in product model numbers. For example, suggest "canon A40" for "canon A45". In another embodiment, the query recommender may find a closer model number. When all terms match some document, the query recommender shall take a content term and find product model alternatives. For example, suggest "sony DCR-DVD200" for "sony dv 200." Further, the query recommender may suggest alternatives with too many results. For example, queries like "sony 100" may produce many matches. The query recommender shall suggest alternatives so that user can submit better queries to get more relevant results. Further still, the query recommender may correct misspelled queries in recommendations and should return a recommendation in a reasonable amount of time because it adds to the duration of the search. In another embodiment, recommended queries may be close to the original query. They should constitute an improvement to be displayed. For example, it should not be a duplicate of the original query, or they should not appear entirely unrelated in any shape or form to the original. Other embodiments may also address integration and priority issues.

Figure 9:
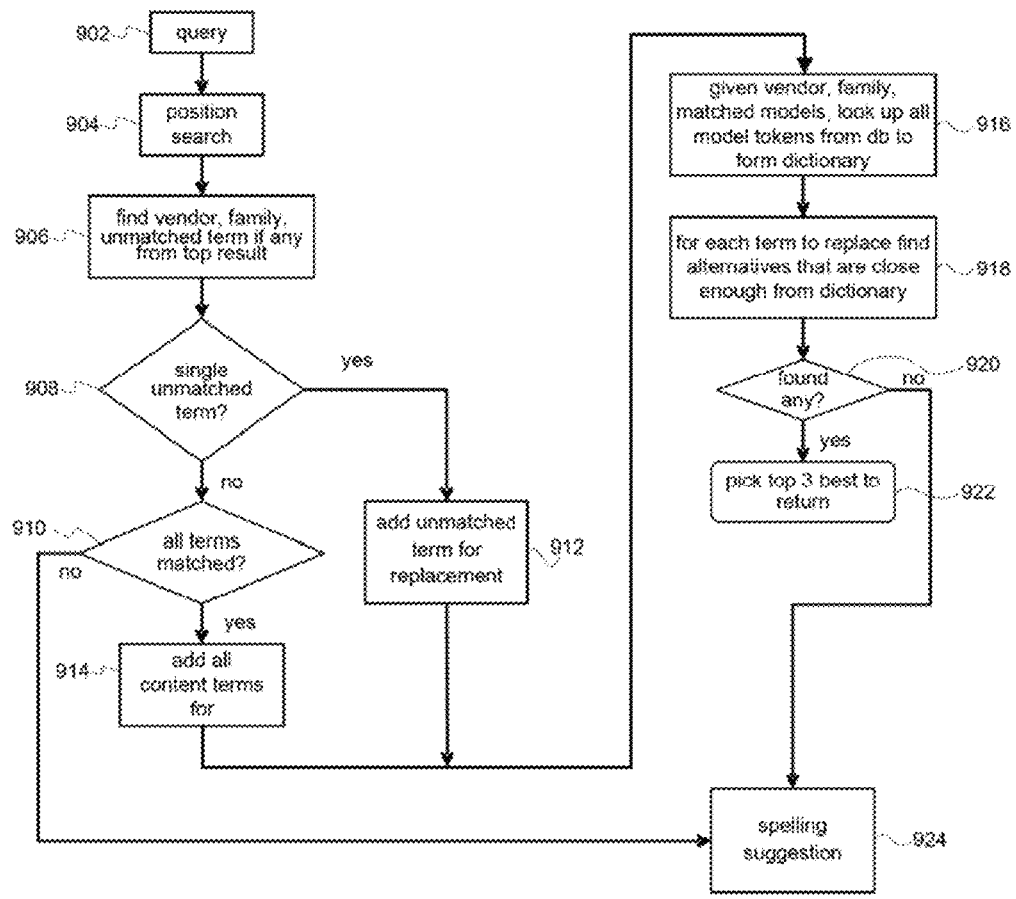
FIG. 9 illustrates one embodiment of the present invention.

As shown in FIG. 9, in one embodiment, the query recommendation process may begin with examining the PDF search results for the original query 902. The terms for replacement are identified. Based on rest of the matched terms in the query, a dictionary is constructed. Additionally, words from the dictionary are sought that are closest to the replacement terms. If the proximity of the candidates passes certain thresholds, the model numbers corresponding to these candidates are returned. Further, the query is reconstructed by replacing old terms with suggestions, and displaying the end results to the user.

If the above process does not yield a recommendation result in step 920, the query may be sent to a spelling suggestion web service 924, e.g. Yahoo! Spelling Suggestion web service. This mainly fixes spelling errors, but also includes commonly-used vendor or family names and other phrases. If the process does yield one or more results in step 920, in step 922 the top three results are chosen to return to the user.

The top result from position search 904 is used to determine whether query recommendation is kicked off. From the top result's match masks, it is determined in step 906 which query term matches the vendor or the family, which term matches a product model number, and which term, if any, does not match any document.

The top result's unmatch mask may identify the unmatched terms. Counting these occurrences and if the count is 1, it can be determined in step 908 that a single term does not match any document. This term to be replaced is added in step 912.

If the top result's unmatch mask is 0 in step 910, all terms have matched some document. Matched terms are then placed into two groups in step 914: (1) product terms—terms that match vendor, family, and/or models, and (2) content terms—terms that match the content of the PDF document. This may be done by looking at vendor, family, full, partial, alpha match masks of the top result. If a term is not matched according to any of these masks, it is a content term. Content terms to be replaced are added.

Neighboring terms (or biwords) in a query often offer stronger contextual semantics. The terms to replace may be decided as follows:
1. ignore terms that are vendor or family
2. if the term has number, include it
3. form a biword using the term and the one before it, if any
4. form another biword using the term the one after it, if any
5. include the bywords A dictionary provides a collection of words from which candidates are selected for recommendations. The dictionary may be formed in optional step 916 based on the following constraints, whichever is known:
1. vendor name
2. family name
3. matched product model numbers These are determined using the top result's match masks.

For example, for query "canon a45" it is found that "a45" is the unmatched term and "canon" is the vendor. The database's model table is then asked to give up all the model number parts for canon. This could be a big collection. The valid model number "a40" should match "a45" most closely and be returned as one of the alternatives.

For query "canon powershot a45", the database is asked to confine the model parts to those models that match both vendor canon and family powershot, which should produce a smaller dictionary.

In an alternate embodiment, the dictionary may be predefined or pre-constructed.

For each term to replace, in step 918 an alternative is determined from the dictionary based on a proximity algorithm. The algorithm assumes as input a list of dictionary terms (known model names that may consist of full model name, alphanumeric or alpha only model parts, etc.), and the query term that needs a recommendation. The output is a sorted list of recommended terms, the models each recommendation represents, and a score (lower the better) for each recommendation. The steps of the algorithm are as follows:

1. Create the feature vectors for the dictionary terms. Each dictionary term is converted into two feature vectors: (i) histogram of alphanumeric character count (counts number of a, b, . . . , z, 0, 1, . . . , 9); and (ii) bi-character and tri-character histogram represented as hashmap (referred to as multi-character histogram). In order to save space (36*36*36 to at most 2*N−3, where N is the term length), each bucket of the histogram is converted into a integer value and its count is stored in the hashmap.
2. Construct the feature vectors for the query term. Details of feature vector same as above.
3. Filter out dictionary terms whose length is over a threshold greater than or less than the length of the query term.
4. Compute the distance between dictionary term and the query term. The distance consists of a distance score weighting the following:
1. Difference in length of dictionary and query term
2. Number of different characters in the alphanumeric histogram
3. If a. and b. are below a threshold then compute a distance score based on multi-character histogram.
4. Normalize the distances based on the query term length.
5. Sort all the distances and cut-off at some a priori defined threshold distance.

The parameters and thresholds in the above mentioned methods can be adjusted to consider the following:

Allow at most n character mismatches (e.g., n=3)

Weight mismatch at beginning of the term more than the mismatch at the end of the term—thus for the query term, d100, term d101 is recommended with a lower distance score (lower score the better) than the term e100.

The query string as the user enters is parsed for performing the search. The main transformations are:

stop words such as "a" are removed words separated by punctuations are broken up. E.g., "dcr-hc20" becomes "dcr hc20" neighboring words are concatenated to form biwords and are appended After suggestions are produced, the right term(s) may be replaced in the original query and other terms kept untouched. This may be achieved as follows:

get a list of query term tokens. These tokens are saved during query string parsing.

They include stop words and words split up by punctuation. E.g., for "the sony dcr-hc22 picture red-eye", the tokens are {the sony dcr hc22 picture red eye} find the char position range of the replacement. Suppose dcr-hc22 is to be replaced, and the char position range in the original query is 9 to 16.

loop through each token obtained in step 1 for each one, get its position in the parsed query. Because stop words are removed, a token may not appear in the parsed query or its position is changed in the parsed query. E.g., the positions for the example are shown in Table 16.

add the token to the output if the following are all true:

the token's term position in the parsed query is −1 or it is not at the position to be replaced the token is not part of the suggestion the token is outside the char position range found in step 2 the token has not been previously added otherwise add the suggestion to the output if the following are all true:

the token's term position in the parsed query is the position to be replaced the token is within the char position range found in step 2 the replacement has not been previously added

TABLE 16

| | the | sony | dcr | hc22 | picture | red | eye |
|---|---|---|---|---|---|---|---|
| char pos in original query | 0 | 4 | 9 | 13 | 18 | 26 | 30 |
| term pos in original query | 0 | 1 | 2 | 3 | 4 | 5 | 6 |
| term pos in parsed query | −1 | 0 | 1 | 2 | 3 | 4 | 5 |
| to be replaced? | no | no | yes | yes | no | no | no |

This algorithm prevents the following malformed query suggestions from happening:

missing stop words duplicate replacement like: "the song dcr-hc20 dcr-hc20 picture . . . "

duplicate punctuation-separated terms like: " . . . picture red-eye red-eye"

In addition, the following verification steps may be performed after getting the query suggestion.

if the input term is biword, the recommendation must also be biword the left and right parts of the recommended biword is similar to those of the input biword. I.e., if they have numbers before, they must have numbers after.

the recommended term must not be the same or a substring of the input term. If so the recommendation does not seem to be an enhancement.

Query Processing

Referring again to FIG. 2, in one embodiment, the content of the document is stored inside the index 224. Each word from the content is further tagged with the section and paragraph from which the word comes from. After a query is submitted to the search engine, the query is processed to retrieve the matching documents from the search index 224.

Matching Content

Figure 10:
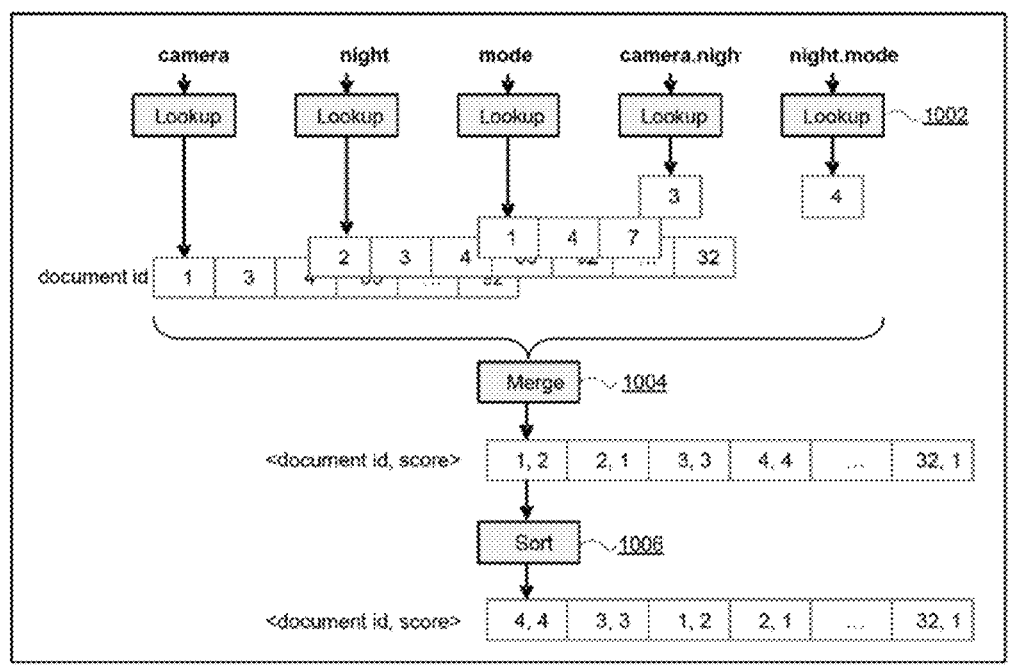
FIG. 10 illustrates an example of a traditional lookup, merge, and sort which may be implemented in an embodiment of the current invention.

FIG. 10 illustrates an example of a traditional lookup 1002, merge 1004, and sort 1006 which may be implemented in some embodiments. A search engine may perform a look up 1002 for the term given in the query in the index, and then return a list of document ids in ascending order for that term. Then a merge process 1004 is used to combine the terms matched for each document together to form a score based on how many terms matched for each document as well as other information such as the term frequency in that document and the overall term frequency across all documents.

Figure 11:
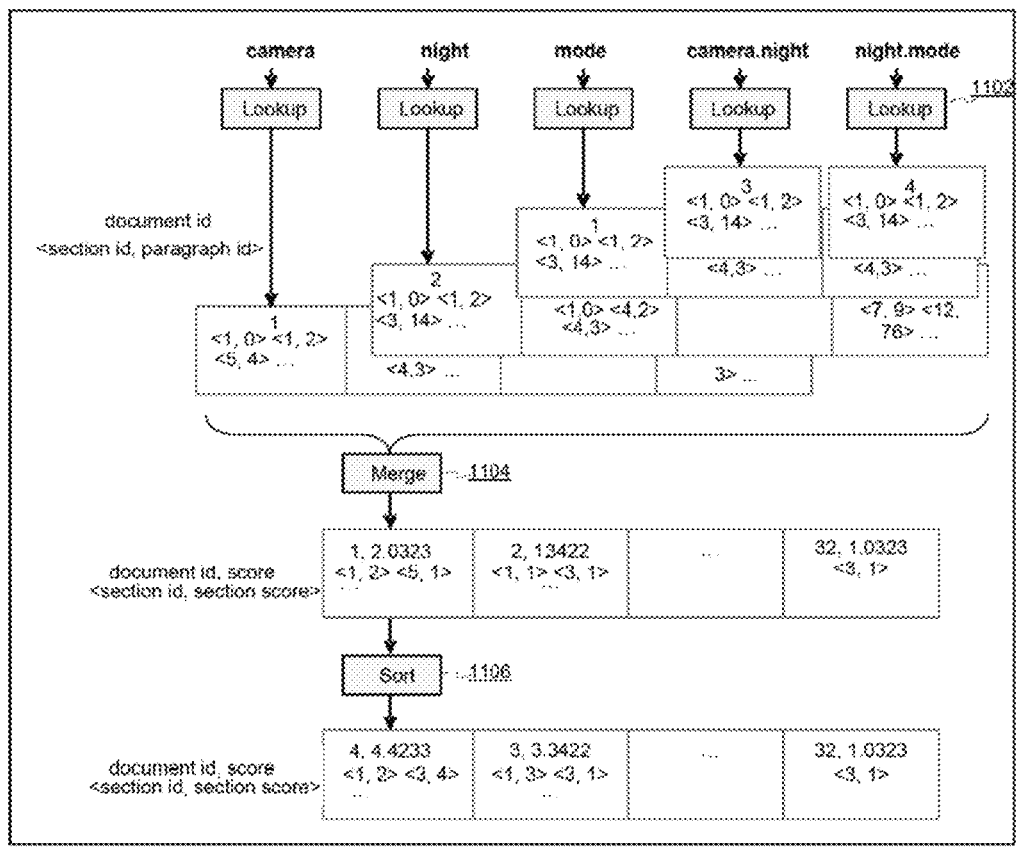
FIG. 11 illustrates an example of a preferred embodiment for content lookup, merge, and sort in accordance with one embodiment of the present invention.

An example of a preferred embodiment for content lookup, merge, and sort is shown in FIG. 11. In this embodiment, a unique lookup 1102, merge 1104, and sort process 1106 that take into consideration the section and paragraph information may be used. In the lookup 1102, each term is looked up against the search index to find the list of documents that contains the term. However, in addition to the document id, the lookup process returns the "section id, paragraph number" for each term as well. Since the indexing process encodes the section id and paragraph number into a 32-bit position id value, a list of <document id, position id> integer pairs is returned in ascending order.

For the merge process 1104, all terms appearing in the same paragraph are combined to form a local paragraph score, and then all paragraphs from the same section are combined to form a section score. Finally, the section scores from the same document are used to produce a document score.

The search result is still sorted using sort process 1106 by the final document score as before. But for each document, not only is the score for that document produced, but also the list of sections and for each section, a section score and the top 3 paragraphs (or more or less) that have the best match for that section are stored. Additionally, a set of flags indicating which term has matched for this document in the result is returned. These flags can be used by the application to further refine ranking, create query recommendation, and control display.

Content Scoring

For example, in one embodiment, a score is generated for each matching document during the merge process. This score may be built up piece by piece using the following illustrative process or variations thereof.

For each paragraph, determine how many keywords matched for that paragraph and which keywords matched for that paragraph.

For each section, find up to 3 top paragraphs. This is done by first finding the paragraph with the highest number of matching keywords. Then look for 2 other paragraphs that compliment the first found paragraph. A complimentary paragraph contains the most number of keywords not already covered by the found paragraph. When multiple paragraphs have the same level of complimentary value, then the paragraphs closest to the found paragraph are chosen.

Create a section score by counting the total number of different keywords matched from all paragraphs of that section, and then adjust it using the scores from the top 3 paragraphs. Also adjust the score by taking into account any matches from paragraph 0. Paragraph 0 indicates that the title of the section matched. Also, the score can be adjusted by counting how many bi-words matched inside this section as well. For each document, create a document score by looking at the total number of keywords matched, and then adjust the score using the best section score from this document.

The result of the document scoring is a set of object containing the following information for each document score:
  A document id
  A document overall score
  A list of section scores. For each section score:
  section id
  section overall score
  A list of up to 3 paragraphs. For each paragraph:
  a paragraph id
  a paragraph score
  A list of flags, indicating which term has matched in this document Matching Context and Context Scoring In one embodiment, context matching is done at the same time as content matching because the context information is stored inside the same index, with the term position set to section 0. There is no additional logic required to figure out if a term matched inside the context. Further, context scoring is done by first determining if a match is for the context. This is easily implemented by checking the section number of the match for a document. If a match results in section 0, then it is for the context. Then, based on the matching paragraph id, it can be determined which one of the meta data the term matched in. For example, if the term "sony" produces a match on section 0 and paragraph 0, then it is known that "sony" is a vendor term for this document. However, if the term "sony" produces a match on section 12, paragraph 3, then the document is not about sony, but the word sony is mentioned inside the content of the document Further, during context scoring, score values for the following meta data fields are produced:
  Vendor
  Family
  Full model
  Partial model
  Document type
  Document title Then the values for these meta fields are added to the score value produced from the content matches to create the final document score. Additionally, taxonomy matching may be performed as part of or separate from context scoring utilizing taxonomy information 232.

When a term matches in both the vendor/model/family context and the content, its importance may be reduced for the content section scoring. For example, if a document is about a "sony" product, then "sony" may match inside the vendor context meta data field. However, section references to the term "sony" inside the content carry less meaning than other terms such as "focus".

The value given to a term matches in the meta field is generally greater than the same match found in the content field. For example, if the term "manual" matched the "Document Type" field, then this document may get a higher score than another document that has this term matched only in its content.

The meta fields contain special words that have strong semantics for a document. By leveraging these special terms inside the meta field, not only is a better and semantically more relevant ranking created across documents, but better ranking is also produced within the sections of the same document.

One of the query term is the word "_len". "_len" is a special term that can only match inside the context meta data. There is only one len term for a document. This term exists in section 0, paragraph 10 or above. During the context scoring, the paragraph id of the match for "_len" is taken and subtracted by 10. The resulting number is the encoding full model number length. The full model length is used to assist in computing the score value for the full and partial model match.

It is also noted which term matched which meta field. This information is stored inside a set of flags and passed to the application layer. The application layer uses this information to perform query recommendation and adjust display ranking.

Query Performance

Because searches may be performed into sections and paragraphs of a document, such a search takes more computational cycles when compared to a traditional document level searcher. Assuming that a traditional search engine uses $O(N)$ to locate relevant documents, where N is the total number of documents. The current approach would consume $O(N*S*P)$ where S is the average number of sections per document that has at least one term match and P is the average number of paragraphs per section that has at least one term match. It is estimated that a document has an average of 100 logical sections with each section containing 30 paragraphs. When a document matched the given query, roughly 25% of the sections may contain at least one match, and within each matching section, 50% of the paragraphs may contain a match. As a result, the current document search would perform $O(375*N)$ comparing to a traditional search engine. But a worst case performance happens when a term matches in all paragraphs. In that worst case, the performance is $O(3000*N)$, which is acceptable.

Understanding the performance characteristics allows for the determination of when to start distributing the search loads across multiple servers.

Post-Processing Search Results

Referring again to FIG. 2, in one embodiment, results of a search 234 may be post processed to improve the results. A multi-stage post processing may be employed to efficiently and effectively filter out poor results or boost more relevant results. A poor result is defined as a result without a good product match resulting from either a low product score or an unintended product match for a very generic alphabetic query. The PDF search results are post processed by filtering out results with poor product matches, and re-ranking results based on document type.

After a user query 226 is submitted to a search engine 236, the result 234 is a list of documents ordered by the search result score. The search result score is a combination of the content score and context score. Content score is the score given to the document based on keyword matches inside the sections and paragraphs of the document content. Context score is based on the keyword matches inside the meta data about the document. Meta data includes items such as vendor, model, family, title, and document type, and may include taxonomy-related information.

For each document returned in the result list, the following information is returned:

Mask of query terms that matched in content or context
Mask of query terms that matched in vendor
Mask of query terms that matched in model
Mask of query terms that matched in family
Mask of query terms that matched in vendor
Mask of query terms that matched in title
Mask of query terms that matched in document type
A combined document score
A product only score
A list of sections that contain at least one term that matched
For each section above:
A section score
Paragraph id from up to 3 paragraphs from that section that are picked for summary In one embodiment, results with poor product matches are filtered out. For example, one of the assumptions concerning the PDF search results is that a PDF document should not be returned unless the product model is relevant to the user query. Irrelevance of the PDF document can occur either due to a mismatch (e.g., all query terms match well in the content, but don't match a particular product) or due to a generic, non-product-specific user query (certain words in the query match a product, but these are not specific enough).

The former case (product mismatch) may be handled via a threshold on the difference between consecutive document scores. If the product score difference falls below a threshold then all documents below the current doc are filtered out.

In order to handle generic query terms that may not be product specific, such as numbers that may represent features (4800 dpi, 50 inch, etc.) or generic terms in a product (product such as "digital camera solution disk") further checks may be employed. For instance, if there isn't a vendor or family match then there is an alphanumeric product model match for the product model to be considered relevant to the query. Thus, "dvd101 picture quality" may return a PDF document for song dcr-dvd101, whereas "101 picture quality" or "dvd picture quality" may not. Additionally, if a vendor or family have matched then either there is a numeric product term match (thus, "Kodak 4800 picture quality" may return a PDF document, but "Kodak dc picture quality" may not), or in case of alphabetic product term matches, there is a complete product match. Thus, "canon digital camera solution disk" may return a PDF document for the product "digital camera solution disk", whereas "canon digital camera" may not return a product document.

In yet another embodiment, results may be re-ranked based on doctype. For example, certain doctypes (document categories) are considered a higher interest than others for generic user queries. In order to boost the rank of documents of these categories, a specific weight is added to the document types. This boost is referred to as the docTypeBoost.

All things being equal, this boost ranks certain types of documents over others. Specifically, user manuals are given the highest weight. Therefore, a query with only the vendor and product match may preferentially show a user manual before a warranty document. Additionally, a higher weight may be assigned to a textual document matching a term in the index of a document and present on a page of the document pointed to in the index in association with the term.

Section Summary Reconstruction

In another embodiment, section summary reconstruction may be performed. For example, when a document is returned as a match, the section summary is displayed from that document. Sometimes, the user query is about selecting the document as a whole, rather than searching for items within the document. For example, if the user query is "Sony dvd101 user guide", then the user is probably searching for the entire document. If the user query is "Sony dvd101 focus settings", then the user is probably searching for the section in the document about focus settings.

While the search engine may return sections within a matched document, these sections may not be relevant for display if the user query is about the entire document. Rather, each document is preferably post processed in the result set with the following logic to detect this situation. First, the match masks are used to see if all terms of the query appear in vendor, family, model, title, and document type. If they do, the document's matching section is changed to include section 1, which is the first chapter, and optionally a section with the title including the keyword "Specification."

With this processing, query results for searches for product documents displays the title page of the document as the first section and the specification section (if found) as the second section. The original matched sections from the search engine are ignored.

Figure 12:
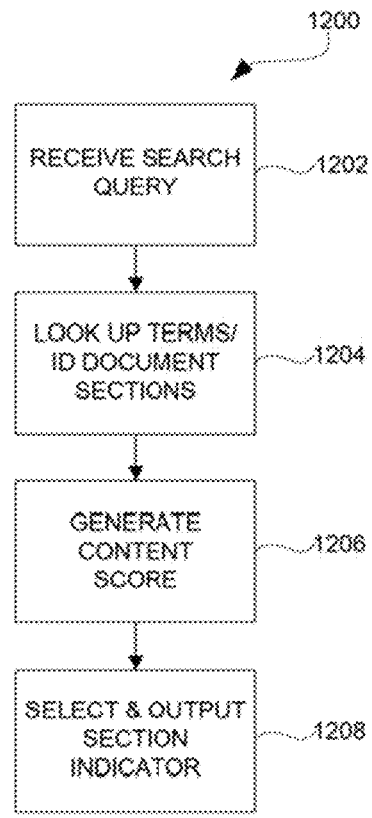
FIG. 12 illustrates a flow diagram of a method for processing a search query in accordance with one embodiment of the present invention.

FIG. 12 is a flow diagram of a method 1200 for processing a search query in accordance with one embodiment of the present invention. As an option, the process 1200 may be implemented in the context of the architecture and environment of FIGS. 1-11. Of course, however, the process 1200 may be carried out in any desired environment.

As shown in FIG. 12, a search query containing terms is received in step 1202. In step 1204, at least some of the terms are looked up in a search index for identifying sections of documents containing the at least some of the terms. Additionally, in step 1206, a content score is generated for each of the sections based at least in part on a number of keywords found in the sections of each document. It may also be determined whether the search query includes a product identifier or portion thereof associated with a product, and if so, the documents not relating to the product associated with the product identifier may be filtered out. Further, in step 1208 an indicator of at least one of the sections, or portion thereof, is selected and output based at least in part on the content score. An indicator of a paragraph of at least one of the sections may also be selected and output, where the selecting and outputting of the indicator of the at least one of the sections, or portion thereof, may be based at least in part on types of the documents. It may also be determined whether the search query is directed to an entire document rather than one or more sections thereof, and if so, an indicator of the document may be selected and output instead of the at least one of the sections, or portion thereof, of the document.

Additionally, a search may be performed for at least some of the terms in the search index in order to attempt to match one or more of the terms to context information in the search index, where the context information is associated with at least one of the documents. A context score may also be generated based at least in part on the matching of the terms of the context information, where the selection of the at least one of the sections, or portion thereof, is also based at least in part on the context score.

In another embodiment, an index structure for keyword searches is presented, the index structure being embodied on a computer readable medium, e.g. a hard disk, a magnetic tape, ROM, RAM, optical media, etc. The index structure comprises a plurality of content words. Additionally, the index structure comprises, for each of the content words, at least one document identifier, e.g. an id, containing information about a document containing the content word. For each of the document identifiers, the index structure further comprises at least one position identifier containing information about a section in the document containing the content word.

Additionally, at least some of the position identifiers may further contain information about a paragraph in the section of the document containing the content word. Further, at least some of the position identifiers may include a weighting value of the content word. Further still, the weighting value may be based at least in part on a position of the content word in the document. The index structure may further comprise context meta data associated with at least some of the documents, where the context meta data indicates a context of the documents associated therewith. Additionally, at least some of the context meta data may be weighted.

Product Search User Interface

In yet another embodiment, a search WEB portal may provide an interface for users to enter product queries in a Web browser. After the query is entered, the search results are displayed. Users can navigate the result pages using various hyperlinks to see more results, preview site, as well as submit additional queries.

The portal provides unique features such as quick preview, dynamic navigation, and persistent states. Further, the portal provides simple query input control, like other search engines, displays the title, url, and summary of search results, and displays search results in channels. Also, the portal provides channel drill down to see more results, enables users to quickly preview selected search results, provides reasonable "fast" response time, and allows customization of the display. The portal may support any web browser, for example, Internet Explorer 6+ and Firefox 1.5+ on WINDOWS® 2000/XP and Safari 1.2+ on Mac OS X 10.2+.

Landing Page

Figure 13:
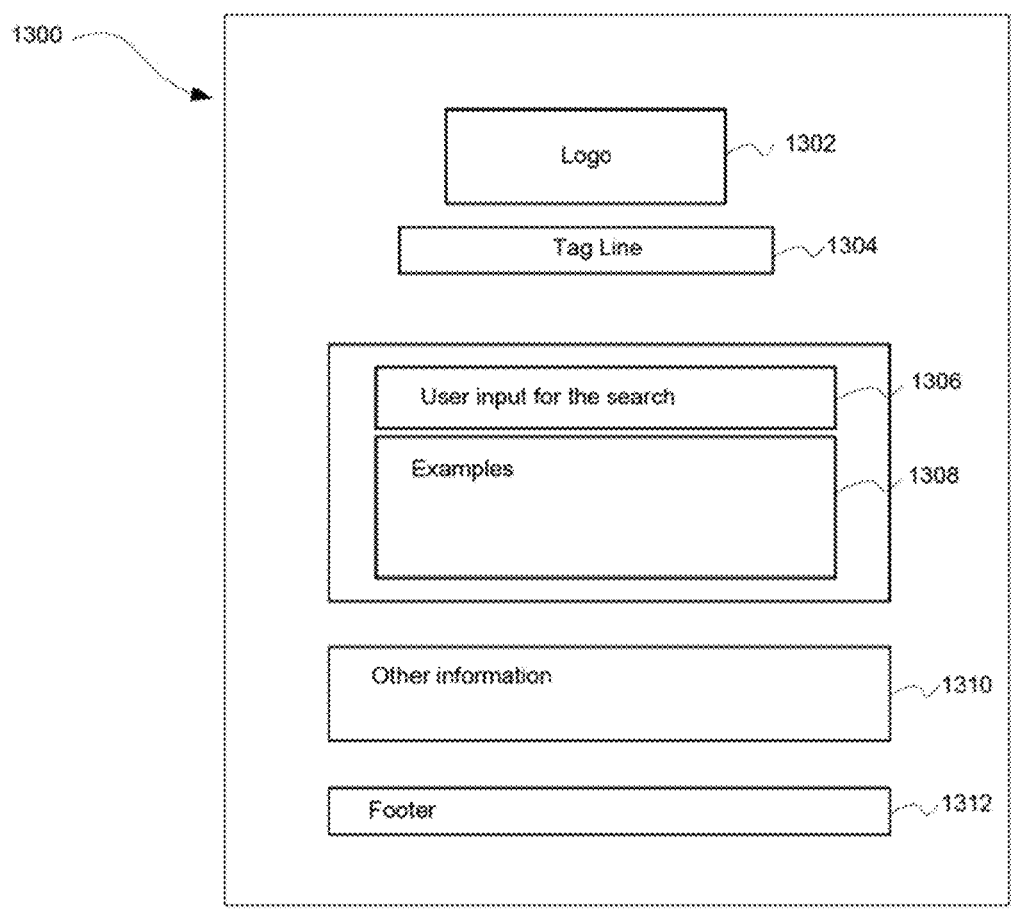
FIG. 13 illustrates a landing page in accordance with one embodiment of the present invention.

FIG. 13 is a landing page 1300 in accordance with one embodiment of the present invention. As an option, the landing page 1300 may be implemented in the context of the architecture and environment of FIGS. 1-12. Of course, however, the process 1300 may be carried out in any desired environment.

As shown in FIG. 13, the logo 1302 displays the company logo. Additionally, the tagline 1304 displays the company tagline. The tagline can change dynamically by editing a template file without restarting the server. Further, the user input element 1306 is an entry box used by the user to enter the query for the search. The examples element 1308 is an area which contains example queries to educate the user on how to use the system. Like the tagline, this area is dynamic and can change without restarting the server. Further still, the other information element 1310 is an informational area used to communicate with the user. This area can also be dynamically updated without restarting the server. Also, the footer element 1312 contains a list of hyperlinks to pages such as about us, terms of use, privacy policy, and feedback.

Figure 14:
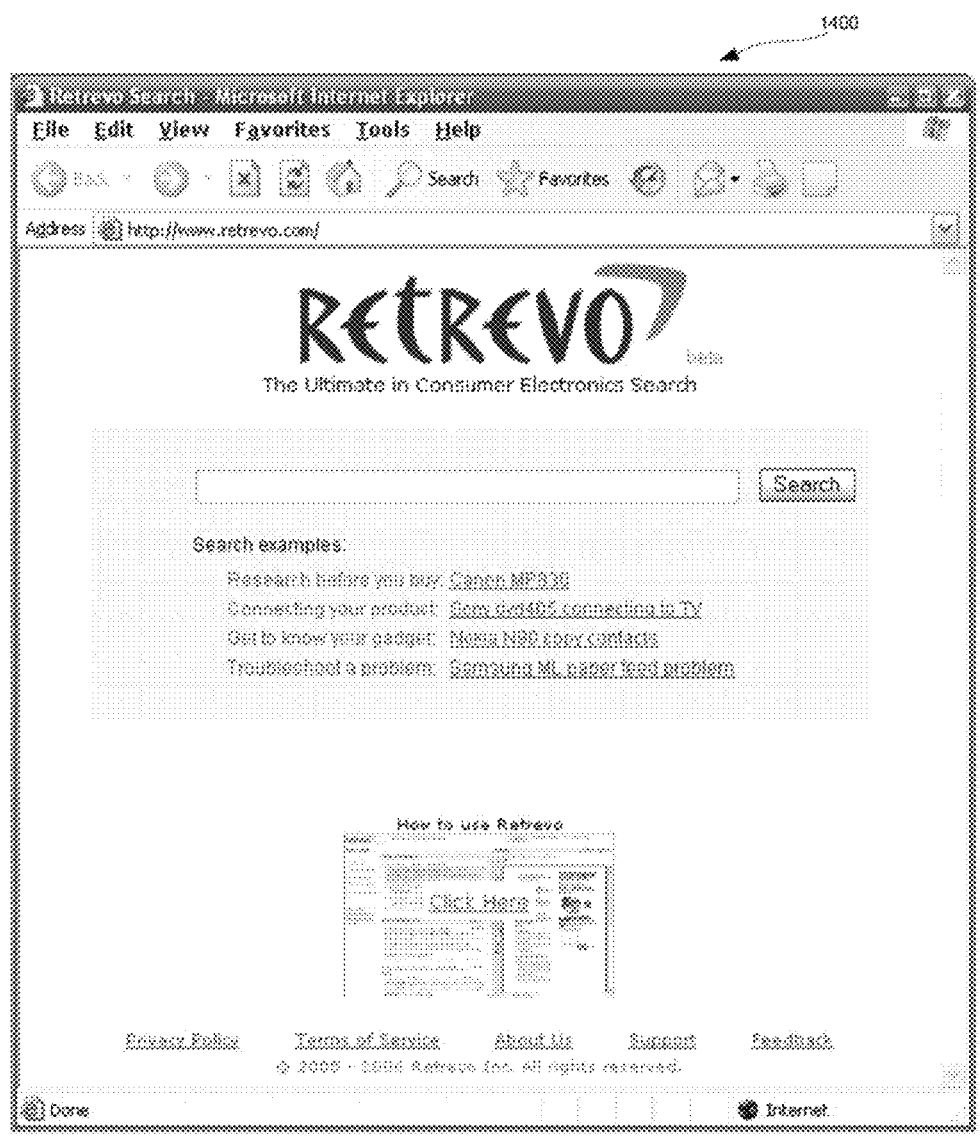
FIG. 14 illustrates a landing page implementation in accordance with one embodiment of the present invention.

A possible landing page implementation 1400 is shown in FIG. 14, the various portions of which are self explanatory.

Search Result Page

Figure 15:
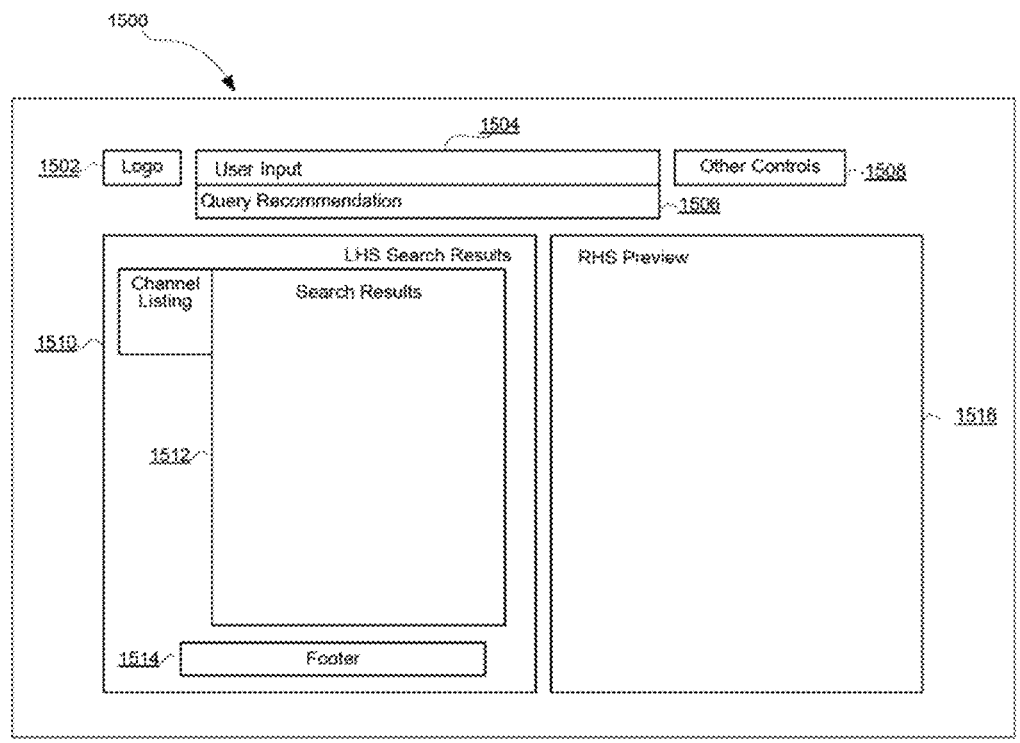
FIG. 15 illustrates a search result page in accordance with one embodiment of the present invention.

FIG. 15 is a search result page 1500 in accordance with one embodiment of the present invention. As an option, the search result page 1500 may be implemented in the context of the architecture and environment of FIGS. 1-14. Of course, however, the search result page 1500 may be carried out in any desired environment.

As shown in FIG. 15, the logo element 1502 is a smaller version of the company logo. Clicking on the logo brings the user back to the landing page. The user input element 1504 allows the user to enter another query to search without going to the landing page. Additionally, the query recommendation element 1506 displays the query recommendation after a search. If there is no query recommendation, then this area is left blank. The other controls element 1508 displays control buttons, for example, "invite friends," "submit feedback," etc.

Below the header portion, the main area of the display is divided into a left hand side (LHS) and a right hand side (RHS). The two sides are resizable with a splitter in the middle. Additional controls are also available to close the RHS or expand the RHS.

Furthermore, inside the LHS, the channel listing element 1510 displays the channels under which the data is displayed. For example, channels may be labeled "Top Results," "Product Documents," "Forums & Blogs," "Reviews & Articles," "Manufacturer Info," "Stores," and "Other." Also, the search results element 1512 is the main display of search results. Each result is made of a title, a summary, and a URL link to the full data. Pressing in the body of the summary brings up a preview of the full data in the RHS. A search result may be for a Web page or for a section of a PDF document. The search results changes based on the selected channel in the channel listing element 1510. Further, the footer element 1514 contains hyperlinks to web pages, for example, "about us," "terms of use," "privacy statement," and "feedback."

Inside the RHS, the RHS preview element 1516 displays the selected search result from the search results area. The displayed page can be either a PDF document page or the content from a Web site. As the user select different search results from the LHS search results area, the content of the RHS changes accordingly. The preview area is a great way to quickly review the search results without losing the left hand side results. As wide aspect ration monitor becomes more common, there is enough horizontal space on the screen to show both the search result and the preview. For users who like a traditional way of viewing the search results without the preview, they can close the preview area entirely.

Figure 16:
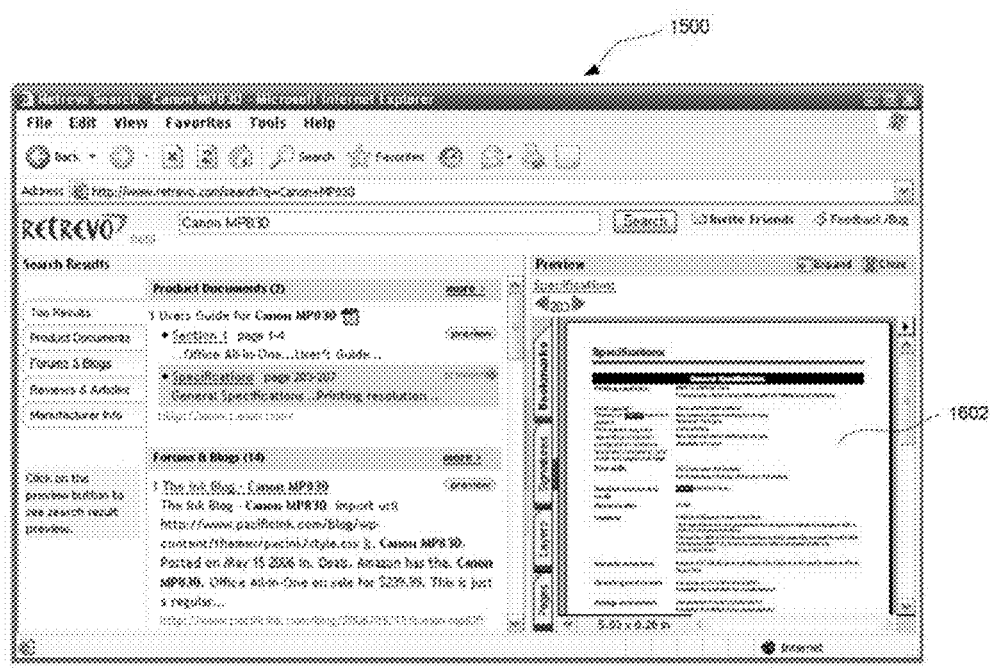
FIG. 16 illustrates an implementation of the search results page displaying a PDF document page in accordance with one embodiment of the present invention.
Figure 17:
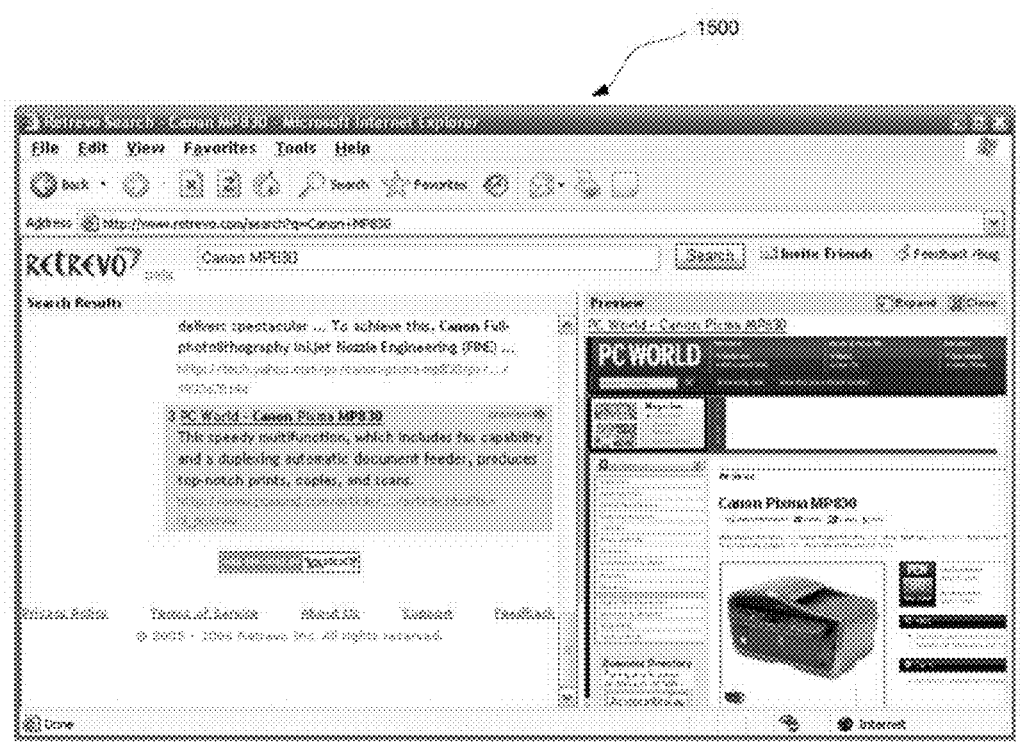
FIG. 17 illustrates an example of the search results page displaying content from a web site in accordance with one embodiment of the present invention.

An example of an implementation of the search results page 1500 displaying a PDF document page 1602 is shown in FIG. 16. Another example of an implementation of the search results page 1500 displaying content from a web site is shown in FIG. 17.

Interface Implementation

In one embodiment, the user interface may be implemented using Java JSP, Tomcat Servlet Container, HTML, JavaScript, CSS, and AJAX. The JSP may be used to place server side dynamic content into the various web pages. HTML and CSS may be used to perform the visual layout. JavaScript and AJAX may be used to provide dynamic changes in response to user actions on the web page.

Figure 18:
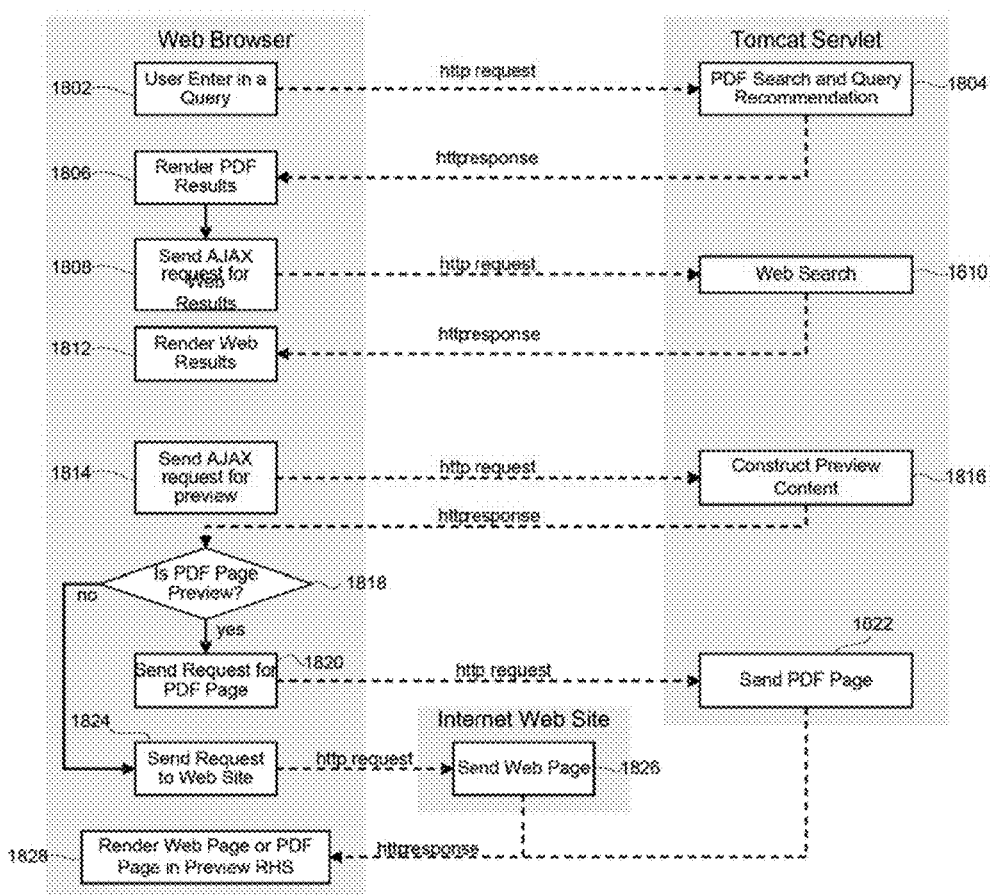
FIG. 18 illustrates an example of the process of submitting a query and display results between the client browser and the server in accordance with one embodiment of the present invention.

One preferred embodiment of the process of submitting a query and display results between the client browser and the server is shown in FIG. 18. As shown in FIG. 18, in step 1802 a user enters a query, and a PDF search and query recommendation are performed in step 1804. The PDF results are rendered in step 1806, and in step 1808 a request is sent to AJAX for web results. Additionally, a web search is performed in step 1810. Further, the web results are rendered in step 1812.

Additionally, in step 1814 a request is sent to AJAX for a preview. Preview content is constructed in step 1816, and in step 1818 it is determined if the preview is a PDF page preview. If it is, in step 1820 a request is sent for the PDF page, and in step 1822 the PDF page is sent and is rendered in preview RHS in step 1828. If the preview is not a PDF page preview, in step 1824 a request is sent to a web site, and in step 1826 the web page is sent and is rendered in Preview RHS in step 1828.

Displaying PDF Page Preview

In another embodiment, the PDF page preview may be a single PDF page downloaded from our server for display inside the RHS preview pane. Since this page is not HTML, the browser may use a PDF plugin to display the PDF page. Browsers that do not have a PDF plugin may not be able to preview the PDF page. One potential way of resolving that issue may be to generate a graphical image of the page on the server and only serve the resulting image file to the browser. Since most browser supports image display, the latter approach may provide broad compatibility.

Displaying Web Site Preview

In yet another embodiment, the Web site preview is rendered entirely by the web browser. The browser submits a HTTP request directly to the web site referenced in a search result. The web site is then displayed inside the RHS area in an internal frame. On the IE browser, the internal frame is further adjusted such that a zoom factor is applied. As the user move the slider to expand and shrink the RHS window, the rendered web site content zooms in and out accordingly.

Displaying web site inside an internal frame has an effect in that some web site uses JavaScript to detect if it is being rendered inside an internal frame. If it is, it would redirect the browser go the site and display the site content inside the root window. The user interface code does its best to detect this behavior. Once detected, the client side JavaScript notifies the potential problem site with the server. Later, it is verified that the site does have this behavior. If it does, the site is added to a blacklist.

For web results that are on the blacklist, user clicking on the result does not show the preview in the RHS window. Instead, a new top window is created to load the web result.

This situation may be addressed by deploying a Web browser plugin. The plugin may render the given web site in the RHS internal frame. Because the rendering is done by the plugin, the web site is shown in a "top" level window. A plugin for the WINDOWS® platform can be easily created by using ActiveX and loading a WebBrowser control that is built into the operating system. Using the WebBrowser control can also provide zoom in/out capabilities. For other platforms, it may be determined how the plugin can be easily implemented.

In another embodiment, a combination approach may be taken. For users who do not want to install a preview plugin, the existing method may be used with certain sites blacklisted. For users with the plugin, web preview of all sites may be provided. Having the plugin may also allow the implementation of keyword highlighting inside the web page for the user.

User Interface States

In yet another embodiment, the user interface may track the preview result location, the show/hide of the RHS preview window 1516, and the left to right split ratio.

Preview result location is maintained as the user navigate away from the search result page and then use the browser's back button to come back. When the user is back to the search result page, the page automatically select the last previewed result. The show/hide and left-to-right split ratio are remembered persistently for the user's browser.

Server side persistence may also be implemented for user interface states. Having server site persistence allows the user interface preferences to be transferred across different browsers. Server based persistence would require the user to sign up an account.

In addition, AJAX may be used in the user interface to dynamically load data into various frames. Using AJAX gives the user a feeling of faster response time. For example, the results for the PDF portion of the search are displayed first and quickly, and then the Web search results are displayed.

However, web browsers may not support AJAX. Examples of such browsers include Cellphone/PDA, older versions of desktop browsers, and search engine crawlers. In these situations, a combination of techniques may be used. For browsers supporting AJAX, asynchronous data loading may still be used. For other browsers, a traditional technique of constructing the entire search result content, which includes PDF results and Web results, on the server, and then sending that data to the browser, may be used.

Splitting Product Identifiers

Figure 19:
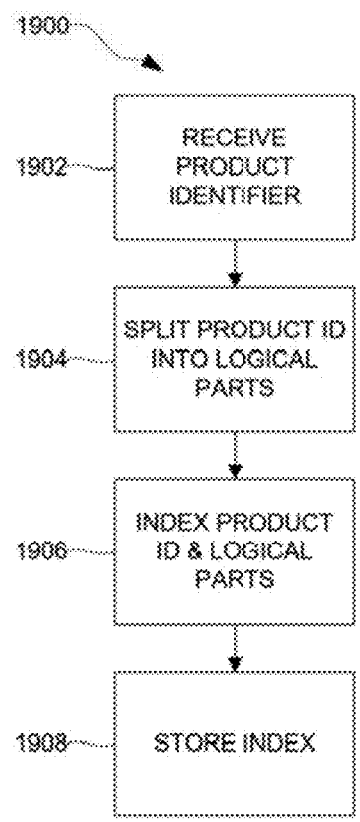
FIG. 19 is a flow diagram of a method for indexing a product identifier and logical parts thereof in accordance with one embodiment of the present invention.

FIG. 19 is a flow diagram of a method 1900 for indexing a product identifier and logical parts thereof in accordance with one embodiment of the present invention. As an option, the method 1900 may be implemented in the context of the architecture and environment of FIGS. 1-18. Of course, however, the method 1900 may be carried out in any desired environment.

As shown in FIG. 19, a product identifier is received in step 1902. Additionally, the product identifier is split into logical parts in step 1904. If the product identifier is an alphanumeric character string, the logical parts may include an alphabetic part and a numeric part of the alphanumeric character string. Further, in step 1906 the product identifier and the individual logical parts in association with a particular document or portion thereof are indexed in an index, and the index is stored in step 1908. Also, if the product identifier comprises multiple logical parts separated by a space, punctuation mark, etc., at least some of the logical parts may be indexed as a single consecutive character string.

Additionally, the product identifier may be indexed in a field for full terms, whereas the logical parts may be indexed in a field for partial terms. If the logical parts include an alphabetic part and a numeric part of the alphanumeric character string, the alphabetic part and the numeric part may be each indexed in a field for partial strings, and/or the alphabetic part may be indexed in a field for alphabetic strings.

In one embodiment, a model number is split into parts and stored 3 areas: full, partial, and alpha-only. One example of splitting logic is as follows:

Loop 1:
7. replace all consecutive punctuations by a single <space>
8. split by <space> into individual parts
9. create biwords from parts, add these biwords full model, if not seen before, save item type as full 10. create biwords without the period, add these to full model, if not seen before, save item type as full Loop 2:

11. split by <space> from the original model name into words
12. remove all punctuation for each word, add to full model, if not seen before, save item type as full
13. for each word, replace all consecutive punctuations by a single <space> for each word
14. then split by <space> into parts
15. if a part is NOT alpha only, add to partial if (not already added before) OR (added before as a full AND part length is <minLen), save item type as not full
16. for each part, further split by CamelCase to produce a list of alpha-only and digit-only tokens
17. if a token is digit only, add to partial if (not already added before) OR (added before as a full AND part length is <minLen), save item type as not full
18. if a token is alpha only, add to alpha if (not already added before) OR (added before as a full AND part length is <minLen), save item type as not full
19. Also add <alpha><numeric><alpha>.<numeric><numeric><alpha><numeric>.<alpha> to partial if (not already added before) OR (added before as a full AND part length is <minLen), save item type as not full Another example of splitting logic, where parameter minLen no longer plays a role, is as follows:

Loop 1:

1. replace all consecutive punctuations by a single <space>
2. split by <space> into individual parts
3. create biwords from parts with a period, add these biwords full model, if not already in full
4. create biwords without the period, add these to full model, if not already in full, if the biword has a digit, also add to partial, if not seen in partial before Loop 2:

5. split by <space> from the original model name into words
6. if there is only one word, remove all punctuation and add this word to full if not already in full; if it has a digit, add to partial if not already in partial
7. for each word, further split by punctuation AND CamelCase to produce a list of alpha-only and digit-only tokens
8. if a token is digit only, add to partial if not already in partial
9. if a token is alpha only, add to alpha if not already in alpha and it is not the whole model
10. Also add <alpha><numeric><alpha>.<numeric><numeric><alpha><numeric>.<alpha> to partial if not already in partial The logic illustrated above results in that if a model is a single word, this word goes into the full and not in the partial or alpha area. Additionally, all biwords, with or without periods, go into the full area. All words and biwords from full without a period that also contains a digit, go into the partial area. Further, all non-biwords that don't contain a digit go into the alpha area, except for the word that is the entire model. An example of this technique is illustrated in Table 17.

TABLE 17

| Model | Full | Partial | Alpha |
|---|---|---|---|
| DCR-HC96 | DCR.HC96 DCRHC96 | DCRHC96 HC96 96 HC.96 | DCR HC |

When a search query is received with part of the identifier or an incorrect identifier, the system may make the best match between the search term and a variant in the index. Additionally, or alternately, the system may recommend a likely match.

Figure 20:
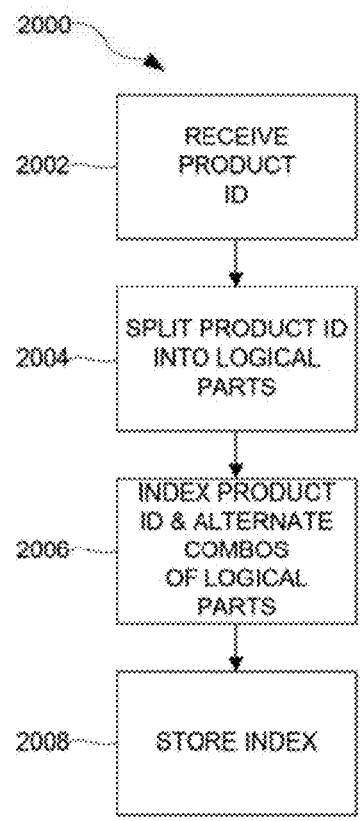
FIG. 20 is a flow diagram of a process for indexing a product identifier and variations thereof in accordance with one embodiment of the present invention.

FIG. 20 is a flow diagram of a process 2000 for indexing a product identifier and variations thereof in accordance with one embodiment of the present invention. As an option, the process 2000 may be implemented in the context of the architecture and environment of FIGS. 1-19. Of course, however, the method 2000 may be carried out in any desired environment.

As shown in FIG. 20, a product identifier is received in step 2002. Additionally, the product identifier is split into logical parts in step 2004. Further, in step 2006 the product identifier and alternate combinations of the logical parts in association with a particular document or portion thereof are indexed in an index, and the index is stored in step 2008. Also, the product identifier may be indexed in a field for full terms, whereas the alternate combinations may be indexed in a field for partial terms.

In another embodiment, a method for processing a search query is presented. In use, a search query containing one or more terms is received. Further, a search index containing complete product identifiers and variations thereof is searched for attempting to match the one or more terms to the product identifiers or the variations thereof. The variations may include a partial product identifier, a reordered product identifier, a modified product identifier, etc. Additionally, if one or more of the terms matches a complete product identifier or variation thereof, an indicator of the document or a portion thereof associated with the matching product identifier is selected and output. If one or more of the terms does not match a complete product identifier or variation thereof, an attempt may be made to make a best match between the one or more of the terms and the product identifiers and variations thereof, and possible matches may be output for user selection. The variations of the product identifiers may include at least one of: parts of the product identifiers, continuous character strings, reordered logical parts of the product identifiers, alphabetical characters only, and numerical characters only.

While embodiments of the present invention have been illustrated and described with reference to specific embodiments, various permutations and modifications will be apparent to those skilled in the art. For example, "code", as used herein, or "module", as used herein, may be any plurality of binary values or any executable, interpreted or compiled code which can be used by a computer or execution device to perform a task. This code or module can be written in any one of several known computer languages. A "module," as used herein, can also mean any device which stores, processes, routes, manipulates, or performs like operation on data. An "incoming communication device" and "outgoing communication device" may be any communication devices which can be used for taking fax information and inputting the fax information into a module. A "text file" or "textual format", as used herein, may be any data format for efficiently storing alphanumerical data. In general, a text file or text format is any data structure which identifies individual alphanumeric characters letters, or language characters from any faxed transmission. A "string", as used herein, is one or more alpha numeric or textual characters which are identified as being part of a group (such as a human name). It is to be understood, therefore, that the various embodiments of this invention are not limited to the particular forms illustrated and that it is intended in the appended claims to cover all possible modifications of the teachings herein.

The present description is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention may be executed illustratively incorporates one or more general-purpose computers or special-purpose devices such facsimile machines and hand-held computers. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

Figure 21:
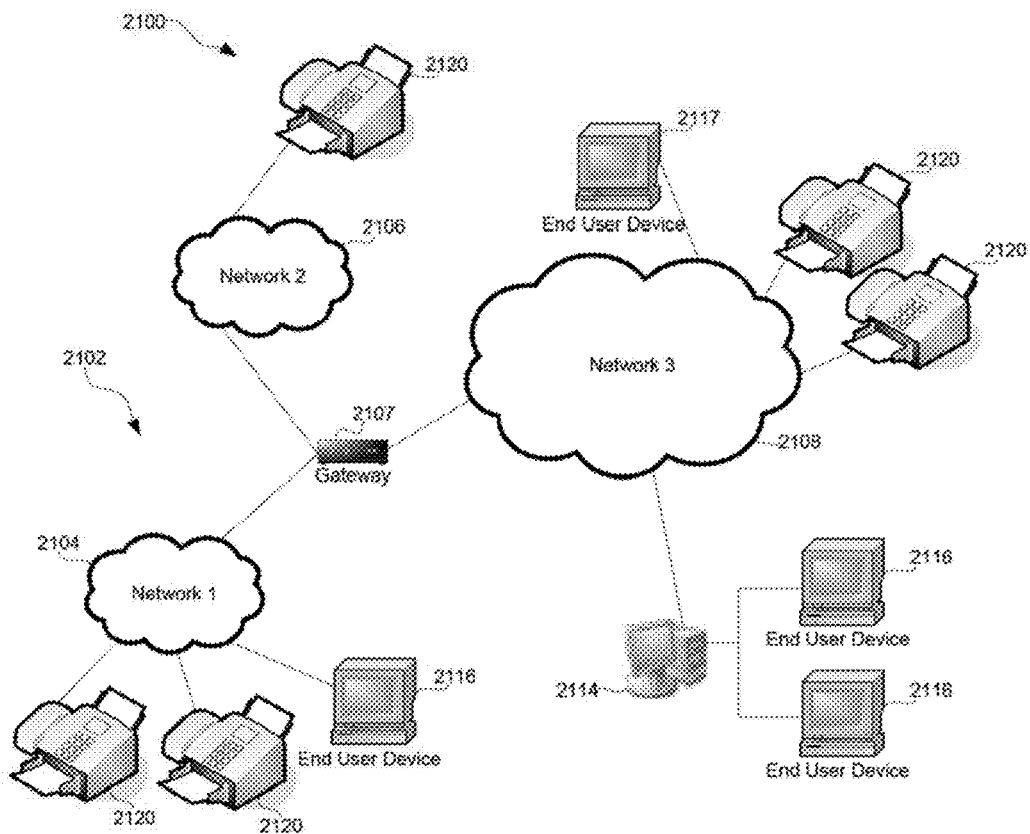
FIG. 21 illustrates a network architecture in accordance with one embodiment of the present invention.

FIG. 21 illustrates a network architecture 2100, in accordance with one embodiment. As shown, a plurality of remote networks 2102 are provided including a first remote network 2104 and a second remote network 2106. A gateway 2107 may be coupled between the remote networks 2102 and a proximate network 2108. In the context of the present network architecture 2100, the networks 2104, 2106 may each take any form including, but not limited to a LAN, a WAN such as the Internet, PSTN, internal telephone network, etc.

In use, the gateway 2107 serves as an entrance point from the remote networks 2102 to the proximate network 2108. As such, the gateway 2107 may function as a router, which is capable of directing a given packet of data that arrives at the gateway 2107, and a switch, which furnishes the actual path in and out of the gateway 2107 for a given packet.

Further included is at least one data server 2114 coupled to the proximate network 708, and which is accessible from the remote networks 2102 via the gateway 2107. It should be noted that the data server(s) 2114 may include any type of computing device/groupware. Coupled to each data server 2114 is a plurality of user devices 2116. Such user devices 2116 may include a desktop computer, lap-top computer, hand-held computer, printer or any other type of logic. It should be noted that a user device 2117 may also be directly coupled to any of the networks, in one embodiment. A facsimile machine 2120 or series of facsimile machines 720 may be coupled to one or more of the networks 2104, 2106, 2108.

It should be noted that databases and/or additional components may be utilized with, or integrated into, any type of network element coupled to the networks 2104, 2106, 2108. In the context of the present description, a network element may refer to any component of a network.

Figure 22:
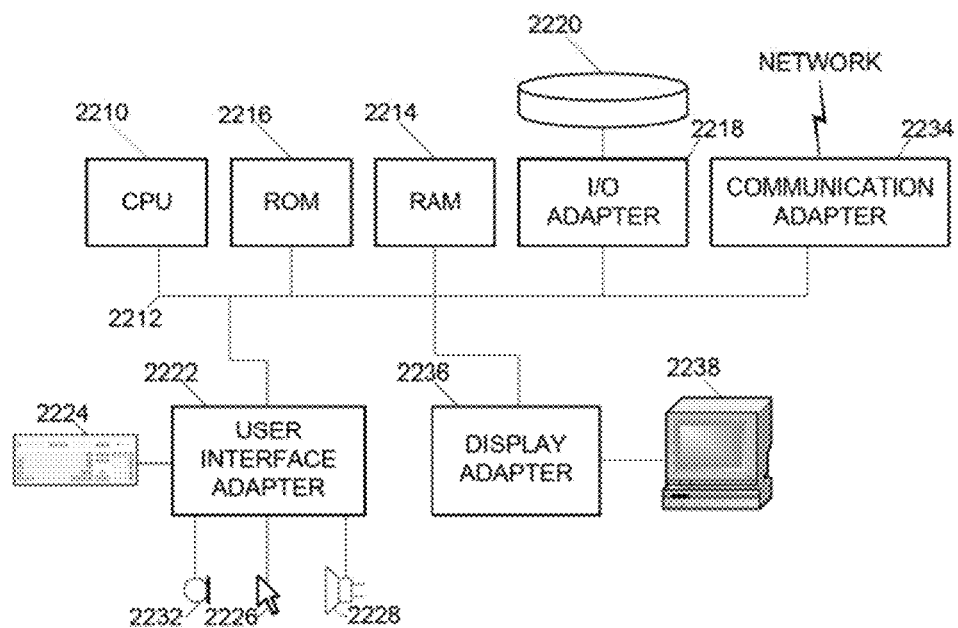
FIG. 22 shows a representative hardware environment, in accordance with one embodiment of the present invention.

FIG. 22 shows a representative hardware environment associated with a user device 2116 of FIG. 21, in accordance with one embodiment. Such FIG. illustrates a typical hardware configuration of a workstation having a central processing unit 2210, such as a microprocessor, and a number of other units interconnected via a system bus 2212.

The workstation shown in FIG. 22 includes a Random Access Memory (RAM) 2214, Read Only Memory (ROM) 2216, an I/O adapter 2218 for connecting peripheral devices such as disk storage units 2220 to the bus 2212, a user interface adapter 2222 for connecting a keyboard 2224, a mouse 2226, a speaker 2228, a microphone 2232, and/or other user interface devices such as a touch screen and a digital camera (not shown) to the bus 2212, communication adapter 2234 for connecting the workstation to a communication network 2235 (e.g., a data processing network) and a display adapter 2236 for connecting the bus 2212 to a display device 2238.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for processing a search query, comprising:
   receiving, by a processor, a search query containing a plurality of terms;
   combining, by a processor, at least some consecutive terms in the search query to create one or more biwords;
   looking up, by a processor, at least one term of the plurality of terms and at least one biword of the one or more biwords in a search index for identifying sections of documents containing the at least one term or at least one biword, or both;

generating, by a processor, a content score for each of the identified sections based at least in part on a number of the terms and biwords found in the sections of each document, wherein the biwords are given a higher priority than matched terms, wherein the priority affects the content score; and selecting and outputting, by a processor, an indicator of at least one of the sections, or portion thereof, based at least in part on the content score;

wherein the generating of the content score includes:

counting a first total number of different terms and different biwords found in a first paragraph of the respective section, the first paragraph containing a greatest total number of different matching terms and different matching biwords among all paragraphs in the respective section;

counting a second total number of different terms and different biwords found in all paragraphs of the respective section; and adding the first total to the second total to obtain the content score.

2. The method as recited in claim 1, further comprising:

looking up at least one term of the plurality of terms and at least one biword of the one or more biwords in the search index, and matching one or more of those terms or biwords to context information in the search index, the context information being associated with at least one of the documents; and generating a context score based at least in part on the matched terms and biwords, wherein the selection of the at least one of the sections, or portion thereof, is also based at least in part on the context score.

3. The method as recited in claim 1, wherein an indicator of a paragraph of at least one of the sections is selected and output.

4. The method as recited in claim 1, wherein the selecting and outputting of the indicator of the at least one of the sections, or portion thereof, is further based at least in part on types of the documents.

5. The method as recited in claim 1, further comprising determining whether the search query includes a product identifier or portion thereof associated with a product, and if so, filtering out documents not relating to the product associated with the product identifier.

6. The method as recited in claim 1, further comprising determining whether the search query is directed to an entire document rather than one or more sections thereof, and if so, selecting and outputting an indicator of the document instead of the at least one of the sections, or portion thereof, of the document.

7. The method as recited in claim 2, further comprising assigning a higher weight to the context score than the content score where at least one of the matched terms and bywords is contained in both the context information and at least one of the identified sections.

8. A non-transitory computer readable storage medium having an index structure for keyword searches stored thereon, the index structure comprising:

a plurality of content words comprising single word terms and one or more biwords, the one or more biwords comprising consecutive single word terms;

for each term of the single word terms and each biword of the one or more biwords, at least one document identifier containing information about a document containing the term or biword;

for each of the document identifiers, at least one position identifier containing information about a section in the document containing the term or byword associated with the document identifier;

for each of the position identifiers, at least one priority bit containing a priority of the term or biword associated with the position identifier, wherein a higher weight is assigned to a given term or biword matching at the position identifier with the priority bits set than at another position identifier without the priority bits set;

wherein at least one of the position identifiers is a multi-bit integer of which a first plurality of bits store a section identifier associated with the respective section and a second plurality of bits store the at least one priority bit; and for each section associated with the section identifier, generating, by a processor, a content score based at least in part on a number of the terms and biwords found in the sections of each document, wherein the biwords are given a higher priority than matched terms, wherein the priority affects the content score;

wherein the generating of the content score includes:

counting a first total number of different terms and different biwords found in a first paragraph of the respective section, the first paragraph containing a greatest total number of different matching terms and different matching biwords among all paragraphs in the respective section;

counting a second total number of different terms and different biwords found in all paragraphs of the respective section; and adding the first total to the second total to obtain the content score.

9. The computer readable storage medium as recited in claim 8, wherein at least some of the position identifiers further contain information about a paragraph in the section of the document containing the associated term or byword.

10. The computer readable storage medium as recited in claim 8, wherein at least some of the position identifiers further contain information about a page in the document containing the associated term or biword.

11. The computer readable storage medium as recited in claim 8, wherein at least some of the position identifiers include a weighting value of the associated term or biword.

12. The computer readable storage medium as recited in claim 11, wherein the weighting value is based at least in part on a position of the associated term or biword in the document.

13. The computer readable storage medium as recited in claim 8, wherein the index structure further comprises context meta data associated with at least some of the documents, the context meta data indicating a context of the documents associated therewith.

14. The computer readable storage medium as recited in claim 13, wherein at least some of the context meta data is weighted.

15. A system for processing a search query, comprising:

a memory;

at least one processor coupled to the memory and configured to:

receive a search query containing a plurality of terms;

combine at least some consecutive terms in the search query to create one or more biwords;
look up at least one term of the plurality of terms and at least one biword of the one or more biwords in a search index for identifying sections of documents containing the at least one term or at least one biword, or both;
generate a content score for each of the identified sections based at least in part on a number of the terms and biwords found in the sections of each document, wherein the biwords are given a higher priority than matched terms, wherein the priority affects the content score; and
select and output an indicator of at least one of the sections, or portion thereof, based at least in part on the content score;
wherein the generating of the content score includes:
  counting a first total number of different terms and different biwords found in a first paragraph of the respective section, the first paragraph containing a greatest total number of different matching terms and different matching biwords among all paragraphs in the respective section;
  counting a second total number of different terms and different biwords found in all paragraphs of the respective section; and
  adding the first total to the second total to obtain the content score.

16. The system as recited in claim 15, wherein the at least one processor further configured to:
look up at least one term of the plurality of terms and at least one biword of the one or more biwords in the search index, and match one or more of those terms or biwords to context information in the search index, the context information being associated with at least one of the documents; and
generate a context score based at least in part on the matched terms and biwords, wherein the selection of the at least one of the sections, or portion thereof, is also based at least in part on the context score.

17. The system as recited in claim 15, wherein an indicator of a paragraph of at least one of the sections is selected and output.

18. The system as recited in claim 15, wherein the indicator of the at least one of the sections, or portion thereof, is selected for output further based at least in part on types of the documents.

19. The system as recited in claim 15, wherein the at least one processor is further configured to determine whether the search query includes a product identifier or portion thereof associated with a product, and if so, filter out documents not relating to the product associated with the product identifier.

20. The system as recited in claim 15, wherein the at least one processor further configured to determine whether the search query is directed to an entire document rather than one or more sections thereof, and if so, select and output an indicator of the document instead of the at least one of the sections, or portion thereof, of the document.

* * * * *